(12) United States Patent
Brown Elliott et al.

(10) Patent No.: US 7,889,215 B2
(45) Date of Patent: Feb. 15, 2011

(54) CONVERSION OF A SUB-PIXEL FORMAT DATA TO ANOTHER SUB-PIXEL DATA FORMAT

(75) Inventors: Candice Hellen Brown Elliott, Santa Rosa, CA (US); Michael Francis Higgins, Duncans Mills, CA (US)

(73) Assignee: Samsung Electronics Co., Ltd. (KR)

( * ) Notice: Subject to any disclaimer, the term of this patent is extended or adjusted under 35 U.S.C. 154(b) by 83 days.

(21) Appl. No.: 12/252,995

(22) Filed: Oct. 16, 2008

(65) Prior Publication Data
US 2009/0046108 A1 Feb. 19, 2009

Related U.S. Application Data

(62) Division of application No. 10/051,612, filed on Jan. 16, 2002, now Pat. No. 7,123,277.

(60) Provisional application No. 60/290,086, filed on May 9, 2001, provisional application No. 60/290,087, filed on May 9, 2001, provisional application No. 60/290,143, filed on May 9, 2001, provisional application No. 60/313,054, filed on Aug. 16, 2001.

(51) Int. Cl.
*G09G 5/10* (2006.01)
(52) U.S. Cl. ................... 345/690; 345/55; 345/426; 345/428; 345/581; 345/613; 345/695
(58) Field of Classification Search ................. 345/695
See application file for complete search history.

(56) References Cited

U.S. PATENT DOCUMENTS 3,971,065 A 7/1976 Bayer 4,353,062 A 10/1982 Lorteije et al.

(Continued)

FOREIGN PATENT DOCUMENTS

DE 299 09 537 U1 10/1999

(Continued)

OTHER PUBLICATIONS

Adobe Systems, Inc. website, http://www.adobe.com/products/acrobat/cooltype.html.

(Continued)

*Primary Examiner*—Antonio A Caschera
(74) *Attorney, Agent, or Firm*—Innovation Counsel LLP

(57) ABSTRACT

A method of determining implied sample areas for each data point of each color in a source pixel data specified in a first sub-pixel format is used for sub-pixel rendering an image on a display specified in a second sub-pixel format. Each of the first and second sub-pixel formats comprises a plurality of colored sub-pixels. The method comprises determining a geometric center of each colored sub-pixel of the first format to define a sampling point; and defining each implied sample area by forming lines that are substantially equidistant between the sampling point of one colored sub-pixel and the sampling point of another neighboring same color colored sub-pixel. A similar technique may be used for determining resample areas for computing color values for rendering an image specified in a first sub-pixel format on a display substantially comprising a plurality of colored sub-pixels arranged in a second sub-pixel format.

11 Claims, 22 Drawing Sheets

U.S. PATENT DOCUMENTS

| | | |
|---|---|---|
| 4,439,759 A | 3/1984 | Fleming et al. |
| 4,593,978 A | 6/1986 | Mourey et al. |
| 4,632,514 A | 12/1986 | Ogawa et al. |
| 4,642,619 A | 2/1987 | Togashi |
| 4,651,148 A | 3/1987 | Takeda et al. |
| 4,737,843 A | 4/1988 | Spencer |
| 4,751,535 A | 6/1988 | Myers |
| 4,773,737 A | 9/1988 | Yokono et al. |
| 4,786,964 A | 11/1988 | Plummer et al. |
| 4,792,728 A | 12/1988 | Chang et al. |
| 4,800,375 A | 1/1989 | Silverstein et al. |
| 4,853,592 A | 8/1989 | Stratham |
| 4,874,986 A | 10/1989 | Menn et al. |
| 4,886,343 A | 12/1989 | Johnson |
| 4,908,609 A | 3/1990 | Stroomer |
| 4,920,409 A | 4/1990 | Yamagishi |
| 4,946,259 A | 8/1990 | Matino et al. |
| 4,965,565 A | 10/1990 | Noguchi |
| 4,966,441 A | 10/1990 | Conner |
| 4,967,264 A | 10/1990 | Parulski et al. |
| 5,006,840 A | 4/1991 | Hamada et al. |
| 5,010,413 A | 4/1991 | Bahr |
| 5,052,785 A | 10/1991 | Takimoto et al. |
| 5,062,057 A | 10/1991 | Blacken et al. |
| 5,113,274 A | 5/1992 | Takahashi et al. |
| 5,132,674 A | 7/1992 | Bottorf |
| 5,144,288 A | 9/1992 | Hamada et al. |
| 5,184,114 A | 2/1993 | Brown |
| 5,189,404 A | 2/1993 | Masimo et al. |
| 5,196,924 A | 3/1993 | Lumelsky et al. |
| 5,233,385 A | 8/1993 | Sampsell |
| 5,311,205 A | 5/1994 | Hamada et al. |
| 5,311,337 A | 5/1994 | McCartney, Jr. |
| 5,315,418 A | 5/1994 | Sprague et al. |
| 5,334,996 A | 8/1994 | Tanigaki et al. |
| 5,341,153 A | 8/1994 | Benzschawel et al. |
| 5,398,066 A | 3/1995 | Martinez-Uriegas et al. |
| 5,416,890 A | 5/1995 | Beretta |
| 5,436,747 A | 7/1995 | Suzuki |
| 5,438,649 A | 8/1995 | Ruetz |
| 5,448,652 A | 9/1995 | Vaidyanathan et al. |
| 5,450,216 A | 9/1995 | Kasson |
| 5,461,503 A | 10/1995 | Deffontaines et al. |
| 5,477,240 A | 12/1995 | Huebner et al. |
| 5,485,293 A | 1/1996 | Robinder |
| 5,535,028 A | 7/1996 | Bae et al. |
| 5,541,653 A | 7/1996 | Peters et al. |
| 5,561,460 A | 10/1996 | Katoh et al. |
| 5,563,621 A | 10/1996 | Silsby |
| 5,579,027 A | 11/1996 | Sakurai et al. |
| 5,642,176 A | 6/1997 | Abukawa et al. |
| 5,646,702 A | 7/1997 | Akinwande et al. |
| 5,648,793 A | 7/1997 | Chen |
| 5,719,639 A | 2/1998 | Imamura |
| 5,724,442 A | 3/1998 | Ogatsu et al. |
| 5,731,818 A | 3/1998 | Wan et al. |
| 5,739,802 A | 4/1998 | Mosier |
| 5,754,163 A | 5/1998 | Kwon |
| 5,754,226 A | 5/1998 | Yamada et al. |
| 5,773,927 A | 6/1998 | Zimlich |
| 5,792,579 A | 8/1998 | Phillips |
| 5,815,101 A | 9/1998 | Fonte |
| 5,821,913 A | 10/1998 | Mamiya |
| 5,856,050 A | 1/1999 | Inoue et al. |
| 5,880,707 A | 3/1999 | Aratani |
| 5,899,550 A | 5/1999 | Masaki |
| 5,903,366 A | 5/1999 | Hirabayashi et al. |
| 5,917,556 A | 6/1999 | Katayama |
| 5,929,843 A | 7/1999 | Tanioka |
| 5,933,253 A | 8/1999 | Ito et al. |
| 5,949,496 A | 9/1999 | Kim |
| 5,973,664 A | 10/1999 | Badger |
| 5,991,438 A | 11/1999 | Shaked et al. |
| 6,002,385 A | 12/1999 | Silverbrook |
| 6,002,446 A | 12/1999 | Eglit |
| 6,005,582 A | 12/1999 | Gabriel et al. |
| 6,008,868 A | 12/1999 | Silverbrook |
| 6,034,666 A | 3/2000 | Kanai et al. |
| 6,038,031 A | 3/2000 | Murphy |
| 6,049,626 A | 4/2000 | Kim |
| 6,054,832 A | 4/2000 | Kunzman et al. |
| 6,061,533 A | 5/2000 | Kajiwara |
| 6,064,363 A | 5/2000 | Kwon |
| 6,064,424 A | 5/2000 | Van Berkel |
| 6,069,670 A | 5/2000 | Borer |
| 6,072,272 A | 6/2000 | Rumbaugh |
| 6,072,445 A | 6/2000 | Spitzer et al. |
| 6,097,367 A | 8/2000 | Kuriwaki et al. |
| 6,108,053 A | 8/2000 | Pettitt et al. |
| 6,108,122 A | 8/2000 | Ulrich et al. |
| 6,137,560 A | 10/2000 | Utsumi et al. |
| 6,144,352 A | 11/2000 | Matsuda et al. |
| 6,151,001 A | 11/2000 | Anderson et al. |
| 6,160,535 A | 12/2000 | Park |
| 6,184,903 B1 | 2/2001 | Omori |
| 6,188,385 B1 | 2/2001 | Hill et al. |
| 6,198,507 B1 | 3/2001 | Ishigami |
| 6,219,025 B1 | 4/2001 | Hill et al. |
| 6,225,967 B1 | 5/2001 | Hebiguchi |
| 6,225,973 B1 | 5/2001 | Hill et al. |
| 6,236,390 B1 | 5/2001 | Hitchcock |
| 6,239,783 B1 | 5/2001 | Hill et al. |
| 6,243,055 B1 | 6/2001 | Fergason |
| 6,243,070 B1 | 6/2001 | Hill et al. |
| 6,262,710 B1 | 7/2001 | Smith |
| 6,271,891 B1 | 8/2001 | Ogawa et al. |
| 6,278,434 B1 | 8/2001 | Hill et al. |
| 6,297,826 B1 | 10/2001 | Semba et al. |
| 6,299,329 B1 | 10/2001 | Mui et al. |
| 6,326,981 B1 | 12/2001 | Mori et al. |
| 6,327,008 B1 | 12/2001 | Fujiyoshi |
| 6,339,426 B1 | 1/2002 | Lui et al. |
| 6,346,972 B1 | 2/2002 | Kim |
| 6,348,929 B1 | 2/2002 | Acharya et al. |
| 6,360,008 B1 | 3/2002 | Suzuki et al. |
| 6,360,023 B1 | 3/2002 | Betrisey et al. |
| 6,377,262 B1 | 4/2002 | Hitchcock et al. |
| 6,385,466 B1 | 5/2002 | Hirai et al. |
| 6,392,717 B1 | 5/2002 | Kunzman |
| 6,393,145 B2 | 5/2002 | Betrisey et al. |
| 6,396,505 B1 | 5/2002 | Lui et al. |
| 6,414,719 B1 | 7/2002 | Parikh |
| 6,429,867 B1 | 8/2002 | Deering |
| 6,441,867 B1 | 8/2002 | Daly |
| 6,453,067 B1 | 9/2002 | Morgan et al. |
| 6,466,618 B1 | 10/2002 | Messing et al. |
| 6,469,766 B2 | 10/2002 | Waterman et al. |
| 6,483,518 B1 | 11/2002 | Perry et al. |
| 6,486,923 B1 | 11/2002 | Maeshima et al. |
| 6,538,742 B1 | 3/2003 | Ohsawa |
| 6,552,706 B1 | 4/2003 | Ikeda et al. |
| 6,570,584 B1 | 5/2003 | Cok et al. |
| 6,577,291 B2 | 6/2003 | Hill et al. |
| 6,583,787 B1 | 6/2003 | Pfister et al. |
| 6,593,981 B1 | 7/2003 | Haim et al. |
| 6,600,495 B1 | 7/2003 | Boland et al. |
| 6,624,828 B1 | 9/2003 | Dresevic et al. |
| 6,661,429 B1 | 12/2003 | Phan |
| 6,674,436 B1 | 1/2004 | Dresevic et al. |
| 6,680,761 B1 | 1/2004 | Greene et al. |
| 6,681,053 B1 | 1/2004 | Zhu |
| 6,714,206 B1* | 3/2004 | Martin et al. ............... 345/589 |
| 6,714,243 B1 | 3/2004 | Mathur et al. |
| 6,738,526 B1 | 5/2004 | Betrisey et al. |

| | | |
|---|---|---|
| 6,750,875 B1 | 6/2004 | Keely, Jr. et al. |
| 6,781,626 B1 | 8/2004 | Wang |
| 6,801,220 B2 | 10/2004 | Greier et al. |
| 6,804,407 B2 | 10/2004 | Weldy |
| 6,833,890 B2 | 12/2004 | Hong et al. |
| 6,836,300 B2 | 12/2004 | Choo et al. |
| 6,842,207 B2 | 1/2005 | Nishida et al. |
| 6,850,294 B2 | 2/2005 | Roh et al. |
| 6,856,704 B1 | 2/2005 | Gallagher et al. |
| 6,867,549 B2 | 3/2005 | Cok et al. |
| 6,885,380 B1 | 4/2005 | Primerano et al. |
| 6,888,604 B2 | 5/2005 | Rho et al. |
| 6,897,876 B2 | 5/2005 | Murdoch et al. |
| 6,903,378 B2 | 6/2005 | Cok |
| 6,930,676 B2 | 8/2005 | De Haan et al. |
| 6,937,217 B2 | 8/2005 | Klompenhouwer et al. |
| 7,123,277 B2 | 10/2006 | Brown Elliott et al. |
| 7,184,066 B2 | 2/2007 | Elliot et al. |
| 7,221,381 B2 | 5/2007 | Brown Elliott et al. |
| 7,248,268 B2 | 7/2007 | Brown Elliott et al. |
| 7,688,335 B2 * | 3/2010 | Brown Elliott et al. ...... 345/613 |
| 2001/0017515 A1 | 8/2001 | Kusunoki et al. |
| 2001/0040645 A1 | 11/2001 | Yamazaki |
| 2001/0048764 A1 | 12/2001 | Betrisey et al. |
| 2002/0012071 A1 | 1/2002 | Sun |
| 2002/0015110 A1 | 2/2002 | Brown Elliott |
| 2002/0017645 A1 | 2/2002 | Yamazaki et al. |
| 2002/0030780 A1 | 3/2002 | Nishida et al. |
| 2002/0054263 A1 | 5/2002 | Kim et al. |
| 2002/0093476 A1 | 7/2002 | Hill et al. |
| 2002/0122160 A1 | 9/2002 | Kunzman |
| 2002/0140831 A1 | 10/2002 | Hayashi |
| 2002/0149598 A1 | 10/2002 | Greier et al. |
| 2002/0186229 A1 | 12/2002 | Brown Elliott |
| 2002/0190648 A1 | 12/2002 | Bechtel et al. |
| 2002/0191130 A1 | 12/2002 | Liang et al. |
| 2003/0011603 A1 | 1/2003 | Koyama et al. |
| 2003/0011613 A1 | 1/2003 | Booth, Jr. |
| 2003/0034992 A1 | 2/2003 | Brown Elliott et al. |
| 2003/0043567 A1 | 3/2003 | Hoelen et al. |
| 2003/0071826 A1 | 4/2003 | Goertzen |
| 2003/0071943 A1 | 4/2003 | Choo et al. |
| 2003/0085906 A1 | 5/2003 | Elliott et al. |
| 2003/0090581 A1 | 5/2003 | Credelle et al. |
| 2003/0103058 A1 | 6/2003 | Elliott et al. |
| 2003/0117423 A1 | 6/2003 | Brown Elliott |
| 2003/0128179 A1 | 7/2003 | Credelle |
| 2003/0128225 A1 | 7/2003 | Credelle et al. |
| 2003/0218618 A1 | 11/2003 | Phan |
| 2004/0008208 A1 | 1/2004 | Dresevic et al. |
| 2004/0021804 A1 | 2/2004 | Hong et al. |
| 2004/0036704 A1 | 2/2004 | Han et al. |
| 2004/0051724 A1 | 3/2004 | Elliott et al. |
| 2004/0061710 A1 | 4/2004 | Messing et al. |
| 2004/0080479 A1 | 4/2004 | Credelle |
| 2004/0085495 A1 | 5/2004 | Roh et al. |
| 2004/0095521 A1 | 5/2004 | Song et al. |
| 2004/0108818 A1 | 6/2004 | Cok et al. |
| 2004/0114046 A1 | 6/2004 | Lee et al. |
| 2004/0150651 A1 | 8/2004 | Phan |
| 2004/0155895 A1 | 8/2004 | Lai |
| 2004/0169807 A1 | 9/2004 | Rho et al. |
| 2004/0174389 A1 | 9/2004 | Ben-David et al. |
| 2004/0179160 A1 | 9/2004 | Rhee et al. |
| 2004/0189662 A1 | 9/2004 | Frisken et al. |
| 2004/0189664 A1 | 9/2004 | Frisken et al. |
| 2004/0196297 A1 | 10/2004 | Elliott et al. |
| 2004/0239813 A1 | 12/2004 | Klompenhouwer |
| 2004/0239837 A1 | 12/2004 | Hong et al. |
| 2004/0263528 A1 | 12/2004 | Murdoch et al. |
| 2005/0007327 A1 | 1/2005 | Elion et al. |
| 2005/0007539 A1 | 1/2005 | Taguchi et al. |
| 2005/0024380 A1 | 2/2005 | Lin et al. |
| 2005/0031199 A1 | 2/2005 | Ben-Chorin et al. |
| 2005/0040760 A1 | 2/2005 | Taguchi et al. |
| 2005/0068477 A1 | 3/2005 | Shin et al. |
| 2005/0083356 A1 | 4/2005 | Roh et al. |
| 2005/0094871 A1 | 5/2005 | Berns et al. |
| 2005/0099426 A1 | 5/2005 | Primerano et al. |
| 2005/0122294 A1 | 6/2005 | Ben-David et al. |
| 2005/0140634 A1 | 6/2005 | Takatori |
| 2005/0151752 A1 | 7/2005 | Phan |
| 2005/0162600 A1 | 7/2005 | Rho et al. |
| 2005/0169551 A1 | 8/2005 | Messing et al. |
| 2005/0190967 A1 | 9/2005 | Ok et al. |
| 2005/0219274 A1 | 10/2005 | Yang et al. |
| 2005/0225563 A1 | 10/2005 | Brown Elliott et al. |
| 2007/0071352 A1 | 3/2007 | Brown Elliott et al. |
| 2007/0109331 A1 | 5/2007 | Brown Elliott et al. |
| 2007/0153027 A1 | 7/2007 | Brown Elliott et al. |

FOREIGN PATENT DOCUMENTS

| | | |
|---|---|---|
| DE | 199 23 527 | 11/2000 |
| DE | 201 09 354 U1 | 9/2001 |
| EP | 0 158 366 A2 | 10/1985 |
| EP | 0 203 005 A1 | 11/1986 |
| EP | 0 322 106 A2 | 6/1989 |
| EP | 0 671 650 A2 | 9/1995 |
| EP | 0 793 214 A1 | 2/1996 |
| EP | 0 812 114 A1 | 12/1997 |
| EP | 0 878 969 A3 | 11/1998 |
| EP | 0 899 604 A2 | 3/1999 |
| EP | 1 083 539 A2 | 3/2001 |
| EP | 1 261 014 A2 | 11/2002 |
| GB | 2 133 912 A | 8/1984 |
| GB | 2 146 478 A | 4/1985 |
| JP | 1984-111196 A | 6/1984 |
| JP | 60-107022 | 6/1985 |
| JP | 02-000826 A | 1/1990 |
| JP | 02-146081 | 6/1990 |
| JP | 02-504324 | 12/1990 |
| JP | 02-983027 B2 | 4/1991 |
| JP | 03-78390 | 4/1991 |
| JP | 03-269567 | 12/1991 |
| JP | 06-102503 | 4/1994 |
| JP | 06-214250 | 8/1994 |
| JP | 07-306656 | 11/1995 |
| JP | 09-120431 | 5/1997 |
| JP | 09-159992 | 6/1997 |
| JP | 11-014978 | 1/1999 |
| JP | 2001203919 | 7/2001 |
| JP | 2004-004822 | 1/2004 |
| WO | WO 97/23860 | 7/1997 |
| WO | WO 00/21067 | 4/2000 |
| WO | WO 00/42564 | 7/2000 |
| WO | WO 00/42762 | 7/2000 |
| WO | WO 00/45365 | 8/2000 |
| WO | WO 00/65432 | 11/2000 |
| WO | WO 00/67196 | 11/2000 |
| WO | WO 01/10112 A2 | 2/2001 |
| WO | WO 01/29817 A1 | 4/2001 |
| WO | WO 01/52546 A2 | 7/2001 |
| WO | WO 02/11112 A2 | 2/2002 |
| WO | WO 02/059685 A2 | 8/2002 |
| WO | WO 03/014819 A1 | 2/2003 |
| WO | WO 2004/021323 A2 | 3/2004 |
| WO | WO 2004/027503 A1 | 4/2004 |
| WO | WO 2004/040548 | 5/2004 |
| WO | WO 2004/086128 A1 | 10/2004 |
| WO | WO 2005/050296 A1 | 6/2005 |
| WO | WO 2005/057532 A2 | 6/2005 |

WO WO 2005/076257 A2 8/2005

OTHER PUBLICATIONS

Betrisey, C., et al., Displaced Filtering for Patterned Displays, SID Symp. Digest 1999, pp. 296-299.

Brown Elliott, C., "Active Matrix Display . . . ", IDMC 2000, 185-189, Aug. 2000.

Brown Elliott, C., "Color Subpixel Rendering Projectors and Flat Panel Displays," SMPTE, Feb. 27-Mar. 1, 2003, Seattle, WA pp. 1-4.

Brown Elliott, C, "Co-Optimization of Color AMLCD Subpixel Architecture and Rendering Algorithms," SID 2002 Proceedings Paper, May 30, 2002 pp. 172-175.

Brown Elliott, C, "Development of the PenTile Matrix™ Color AMLCD Subpixel Architecture and Rendering Algorithms", SID 2003, Journal Article.

Brown Elliott, C, "New Pixel Layout for PenTile Matrix™ Architecture", IDMC 2002, pp. 115-117.

Brown Elliott, C, "Reducing Pixel Count Without Reducing Image Quality", Information Display Dec. 1999, vol. 1, pp. 22-25.

Carvajal, D., "Big Publishers Looking Into Digital Books," The NY Times, Apr. 3, 2000, Business/ Financial Desk.

"ClearType magnified", Wired Magazine, Nov. 8, 1999, Microsoft Typography, article posted Nov. 8, 1999, 1 page.

Credelle, Thomas, "P-00: MTF of High-Resolution PenTile Matrix Displays", Eurodisplay 02 Digest, 2002 pp. 1-4.

Daly, Scott, "Analysis of Subtriad Addressing Algorithms by Visual System Models",SID Symp. Digest, Jun. 2001 pp. 1200-1203.

E-Reader Devices and Software, Jan. 1, 2001, Syllabus, http://www.campus-technology.com/article.asp?id=419.

Feigenblatt, R.I., Full-color imaging on amplitude-quantized color mosaic displays, SPIE, 1989, pp. 199-204.

Feigenblatt, Ron, "Remarks on Microsoft ClearType™", http://www.geocities.com/SiliconValley/Ridge/6664/ClearType.html, Dec. 5, 1998, Dec. 7, 1998, Dec. 12, 1999, Dec. 26, 1999, Dec. 30, 1999, and Jun. 19, 2000, 30 pages.

Gibson, S., "Sub-Pixel Rendering; How it works," Gibson Research Corp., http://www.grc.com/ctwhat.html.

Johnston, Stuart, "An Easy Read: Microsoft's ClearType," InformationWeek Online, Redmond WA, Nov. 23, 1998. 3 pages.

Johnston, Stuart, "Clarifying ClearType," InformationWeek Online, Redmond WA, Jan. 4, 1999, 4 pages.

Just Outta Beta, Wired Magazine, Dec. 1999 Issue 7-12, 3 pages.

Klompenhouwer, Michiel, Subpixel Image Scaling for Color Matrix Displays, SID Symp. Digest, May 2002, pp. 176-179.

Krantz, John et al., Color Matrix Display Image Quality: The Effects of Luminance . . . SID 90 Digest, pp. 29-32.

Lee, Baek-woon et al., 40.5L: Late-News Paper: TFT-LCD with RGBW Color system, SID 03 Digest, 2003, pp. 1212-1215.

Markoff, John, Microsoft's Cleartype Sets Off Debate on Originality, NY Times, Dec. 7, 1998, 5 pages.

Martin, R., et al., "Detectability of Reduced Blue-Pixel Count in Projection Displays," SID Symp. Digest, May 1993, pp. 606-609.

Messing, Dean et al., Improved Display Resolution of Subsampled Colour Images Using Subpixel Addressing, IEEE ICIP 2002, vol. 1, pp. 625-628.

Messing, Dean et al., Subpixel Rendering on Non-Striped Colour Matrix Displays, 2003 International Conf on Image Processing, Sep. 2003, Barcelona, Spain, 4 pages.

"Microsoft ClearType," website, Mar. 26, 2003, 4 pages.

Microsoft Corp. website, http://www.microsoft.com/typography/cleartype, 7 pages.

Microsoft press release, Microsoft Research Announces Screen Display Breakthrough at COMDEX/Fall '98; . . . Nov. 15, 1998.

Murch, M., "Visual Perception Basics," SID Seminar, 1987, Tektronix Inc, Beaverton Oregon.

Okumura et al., "A New Flicker-Reduction Drive Method for High Resolution LCTVs", SID Digest,pp. 551-554, 2001.

Platt, John, Optimal Filtering for Patterned Displays, IEEE Signal Processing Letters, 2000, 4 pages.

PCT International Search Report dated Jun. 3, 2002 for PCT/US02/12610 (Publication No. WO02091349).

PCT International Search Report dated Jul. 17, 2003 for PCT/US02/39859 (Publication No. WO03052725).

PCT International Search Report dated Jul. 30, 2003 for PCT/US02/39860 (Publication No. WO03053068).

PCT International Search Report dated Dec. 9, 2003 for PCT/US03/15283 (Publication No. WO03098335).

PCT International Search Report dated Sep. 30, 2003 for PCT/US02/24994 (Publication No. WO03015066).

PCT International Search Report dated Jun. 14, 2004 for PCT/US03/028222 (Publication No. WO2004025611).

PCT International Search Report dated Apr. 8, 2003 for PCT/US02/39864 (Publication No. WO03060870).

PCT International Search Report dated Apr. 9, 2003 for PCT/US02/39857 (Publication No. WO03060869).

PCT International Search Report dated Jul. 11, 2005 for PCT/US05/010022 (Publication No. WO2005101366).

PCT International Search Report dated Jul. 29, 2008 for PCT/US08/56241 (Publication No. WO2008112557).

PCT International Search Report dated Aug. 21, 2008 for PCT/US08/59916 (U.S. Appl. No. 11/734,275).

Poor, Alfred, "LCDs: The 800-pound Gorilla," Information Display, Sep. 2002, pp. 18-21.

Wandell, Brian A., Stanford University, "Fundamentals of Vision: Behavior . . . ," Jun. 12, 1994, Society for Information Display (SID) Short Course S-2, Fairmont Hotel, San Jose, California.

Werner, Ken, "OLEDS, OLEDS, Everywhere . . . ," Information Display, Sep. 2002, pp. 12-15.

* cited by examiner

CONVERSION OF A SUB-PIXEL FORMAT DATA TO ANOTHER SUB-PIXEL DATA FORMAT

CROSS-REFERENCE TO RELATED APPLICATION

The present application is a divisional of U.S. patent application Ser. No. 11/548,669 filed Oct. 11, 2006 now U.S. Pat No. 7,688,335 as a divisional of U.S. patent application Ser. No. 10/051,612 where the latter was filed Jan. 16, 2002, subsequently issued as U.S. Pat. No. 7,123,277 and the latter claimed benefit of and incorporated by reference the disclosures of U.S. Provisional Patent Application Ser. No. 60/290,086, entitled "Conversion of RGB Pixel Format Data to Pentile Matrix Sub-Pixel Data Format", filed on May 9, 2001, U.S. Provisional Patent Application Ser. No. 60/290,087, entitled "Calculating Filter Kernel Values for Different Scaled Modes", filed on May 9, 2001, U.S. Provisional Patent Application Ser. No. 60/290,143, entitled "Scaling Sub-Pixel Rendering on Pentile Matrix", filed on May 9, 2001, and U.S. Provisional Patent Application Ser. No. 60/313,054, entitled "RGB Stripe Sub-Pixel Rendering Detection", filed on Aug. 16, 2001, where the disclosures of said Ser. Nos. 11/548,669 and 10/051,612 and said Provisional applications are incorporated by reference herein in their entirety.

BACKGROUND

The present application relates to the conversion of graphics data formats from one form to another, and specifically to the conversion of (red-green-blue) RGB graphics to improved color pixel arrangements used in displays.

The present state of the art of color single plane imaging matrix, for flat panel displays, use the RGB color triad or a single color in a vertical stripe as shown in prior art FIG. 1. The system takes advantage of the Von Bezold color blending effect (explained further herein) by separating the three colors and placing equal spatial frequency weight on each color. However, these panels are a poor match to human vision.

Graphic rendering techniques have been developed to improve the image quality of prior art panels. Benzschawel, et al. in U.S. Pat. No. 5,341,153 teach how to reduce an image of a larger size down to a smaller panel. In so doing, Benzschawel, et al. teach how to improve the image quality using a technique now known in the art as "sub-pixel rendering". More recently Hill, et al. in U.S. Pat. No. 6,188,385 teach how to improve text quality by reducing a virtual image of text, one character at a time, using the very same sub-pixel rendering technique.

The above prior art pay inadequate attention to how human vision operates. The prior art's reconstruction of the image by the display device is poorly matched to human vision.

The dominant model used in sampling, or generating, and then storing the image for these displays is the RGB pixel (or three-color pixel element), in which the red, green, and blue values are on an orthogonal equal spatial resolution grid and are co-incident. One of the consequences of using this image format is that it is a poor match both to the real image reconstruction panel, with its spaced apart, non-coincident, color emitters, and to human vision. This effectively results in redundant, or wasted, information in the image.

Martinez-Uriegas, et al. in U.S. Pat. No. 5,398,066 and Peters, et al. in U.S. Pat. No. 5,541,653 teach a technique to convert and store images from RGB pixel format to a format that is very much like that taught by Bayer in U.S. Pat. No. 3,971,065 for a color filter array for imaging devices for cameras. The advantage of the Martinez-Uriegas, et al. format is that it both captures and stores the individual color component data with similar spatial sampling frequencies as human vision. However, a first disadvantage is that the Martinez-Uriegas, et al format is not a good match for practical color display panels. For this reason, Martinez-Uriegas, et al. also teach how to convert the image back into RGB pixel format. Another disadvantage of the Martinez-Uriegas, et al. format is that one of the color components, in this case the red, is not regularly sampled. There are missing samples in the array, reducing the accuracy of the reconstruction of the image when displayed.

Full color perception is produced in the eye by three-color receptor nerve cell types called cones. The three types are sensitive to different wave lengths of light: long, medium, and short ("red", "green", and "blue", respectively). The relative density of the three wavelengths differs significantly from one another. There are slightly more red receptors than green receptors. There are very few blue receptors compared to red or green receptors. In addition to the color receptors, there are relative wavelength insensitive receptors called rods that contribute to monochrome night vision.

The human vision system processes the information detected by the eye in several perceptual channels: luminance, chromanance, and motion. Motion is only important for flicker threshold to the imaging system designer. The luminance channel takes the input from only the red and green receptors. It is "color blind". It processes the information in such a manner that the contrast of edges is enhanced. The chromanance channel does not have edge contrast enhancement. Since the luminance channel uses and enhances every red and green receptor, the resolution of the luminance channel is several times higher than the chromanance channel. The blue receptor contribution to luminance perception is negligible. Thus, the error introduced by lowering the blue resolution by one octave will be barely noticeable by the most perceptive viewer, if at all, as experiments at Xerox and NASA, Ames Research Center (R. Martin, J. Gille, J. Larimer, Detectability of Reduced Blue Pixel Count in Projection Displays, SID Digest 1993) have demonstrated.

Color perception is influenced by a process called "assimilation" or the Von Bezold color blending effect. This is what allows separate color pixels (or sub-pixels or emitters) of a display to be perceived as the mixed color. This blending effect happens over a given angular distance in the field of view. Because of the relatively scarce blue receptors, this blending happens over a greater angle for blue than for red or green. This distance is approximately 0.25°. for blue, while for red or green it is approximately 0.12°. At a viewing distance of twelve inches, 0.25°. subtends 50 mils (1,270µ) on a display. Thus, if the blue sub-pixel pitch is less than half (625µ.) of this blending pitch, the colors will blend without loss of picture quality.

Sub-pixel rendering, in its most simplistic implementation, operates by using the sub-pixels as approximately equal brightness pixels perceived by the luminance channel. This allows the sub-pixels to serve as sampled image reconstruction points as opposed to using the combined sub-pixels as part of a 'true' pixel. By using sub-pixel rendering, the spatial sampling is increased, reducing the phase error.

If the color of the image were to be ignored, then each sub-pixel may serve as a though it were a monochrome pixel, each equal. However, as color is nearly always important (and why else would one use a color display?), then color balance of a given image is important at each location. Thus, the sub-pixel rendering algorithm must maintain color balance by ensuring that high spatial frequency information in the luminance component of the image to be rendered does not alias with the color sub-pixels to introduce color errors. The approaches taken by Benzschawel, et al. in U.S. Pat. No. 5,341,153, and Hill, et al. in U.S. Pat. No. 6,188,385, are similar to a common anti-aliasing technique that applies displaced decimation filters to each separate color component of a higher resolution virtual image. This ensures that the luminance information does not alias within each color channel.

If the arrangement of the sub-pixels were optimal for sub-pixel rendering, sub-pixel rendering would provide an increase in both spatial addressability to lower phase error and in Modulation Transfer Function (MTF) high spatial frequency resolution in both axes.

Examining the conventional RGB stripe display in FIG. 1, sub-pixel rendering will only be applicable in the horizontal axis. The blue sub-pixel is not perceived by the human luminance channel, and is therefore, not effective in sub-pixel rendering. Since only the red and green pixels are useful in sub-pixel rendering, the effective increase in addressability would be two-fold, in the horizontal axis. Vertical black and white lines must have the two dominant sub-pixels (i.e., red and green per each black or white line) in each row. This is the same number as is used in non-sub-pixel rendered images. The MTF, which is the ability to simultaneously display a given number of lines and spaces, is not enhanced by sub-pixel rendering. Thus, the conventional RGB stripe sub-pixel arrangement, as shown in FIG. 1, is not optimal for sub-pixel rendering.

The prior art arrangements of three-color pixel elements are shown to be both a poor match to human vision and to the generalized technique of sub-pixel rendering. Likewise, the prior art image formats and conversion methods are a poor match to both human vision and practicable color emitter arrangements.

SUMMARY

The drawbacks and disadvantages of the prior art are overcome by the conversion of RGB pixel format data to PenTile™ matrix sub-pixel data format.

A method of converting a source pixel data of a first format for a display of a second format having a plurality of three-color pixel elements is disclosed. The method comprises determining implied sample areas for each data point of each color in the source pixel data of the first format. The resample areas for each emitter of each color in the display is also determined. A set of fractions for each resample area is formed. The denominators are a function of the resample area and the numerators are the function of an area of each of the implied sample areas that at least partially overlaps the resample areas. The data values for each implied sample area is multiplied by its respective fraction and all products are added together to obtain luminance values for each resample area.

A method of determining implied sample areas for each data point of each color in a source pixel data of a first format for a display of a second format having a plurality of three-color pixel elements is also disclosed. The method comprises determining a geometric center of each emitter of each of the three-color pixel element of the first format to define sampling points. Then defining each of the implied sample area by lines that are formed equidistant between the geometric center of the emitter of one the three-color pixel element and the geometric center of another same color the emitter of a neighboring three-color pixel element and forming a grid of the lines.

A method of limiting filter kernel divisors in a filter kernel to a value designed to simplify hardware implementations is also disclosed. The method comprises calculating areas for filter coefficients using floating point arithmetic and then dividing each filter coefficient by a total area of a rendering area to receive a first product. Then multiplying the first product by a divisor to produce a filter sum, completing a binary search to find a round off point for the filter sum, and converting the filter sum to integers.

BRIEF DESCRIPTION OF THE DRAWINGS

Referring now to the figures, wherein like elements are numbered alike.

DETAILED DESCRIPTION

Those of ordinary skill in the art will realize that the following description of the present invention is illustrative only and not in any way limiting. Other embodiments of the invention will readily suggest themselves to such skilled persons.

A real world image is captured and stored in a memory device. The image that is stored was created with some known data arrangement. The stored image can be rendered onto a display device using an array that provides an improved resolution of color displays. The array is comprised of a plurality of three-color pixel elements having at least a blue emitter (or sub-pixel), a red emitter, and a green emitter, which when illuminated can blend to create all other colors to the human eye.

To determine the values for each emitter, first one must create transform equations that take the form of filter kernels. The filter kernels are generated by determining the relative area overlaps of both the original data set sample areas and target display sample areas. The ratio of overlap determines the coefficient values to be used in the filter kernel array.

To render the stored image onto the display device, the reconstruction points are determined in each three-color pixel element. The center of each reconstruction point will also be the source of sample points used to reconstruct the stored image. Similarly, the sample points of the image data set is determined. Each reconstruction point is located at the center of the emitters (e.g., in the center of a red emitter). In placing the reconstruction points in the center of the emitter, a grid of boundary lines is formed equidistant from the centers of the reconstruction points, creating sample areas (in which the sample points are at the center). The grid that is formed creates a tiling pattern. The shapes that can be utilized in the tiling pattern can include, but is not limited to, squares, rectangles, triangles, hexagons, octagons, diamonds, staggered squares, staggered rectangles, staggered triangles, staggered diamonds, Penrose tiles, rhombuses, distorted rhombuses, and the like, and combinations comprising at least one of the foregoing shapes.

The sample points and sample areas for both the image data and the target display having been determined, the two are overlaid. The overlay creates sub-areas wherein the output sample areas overlap several input sample areas. The area ratios of input to output is determined by either inspection or calculation and stored as coefficients in filter kernels, the value of which is used to weight the input value to output value to determine the proper value for each emitter.

When sufficiently high scaling ratio is used, the subpixel arrangement and rendering method disclosed herein provides better image quality, measured in information addressability and reconstructed image modulation transfer function (MTF), than prior art displays.

Figure 1:
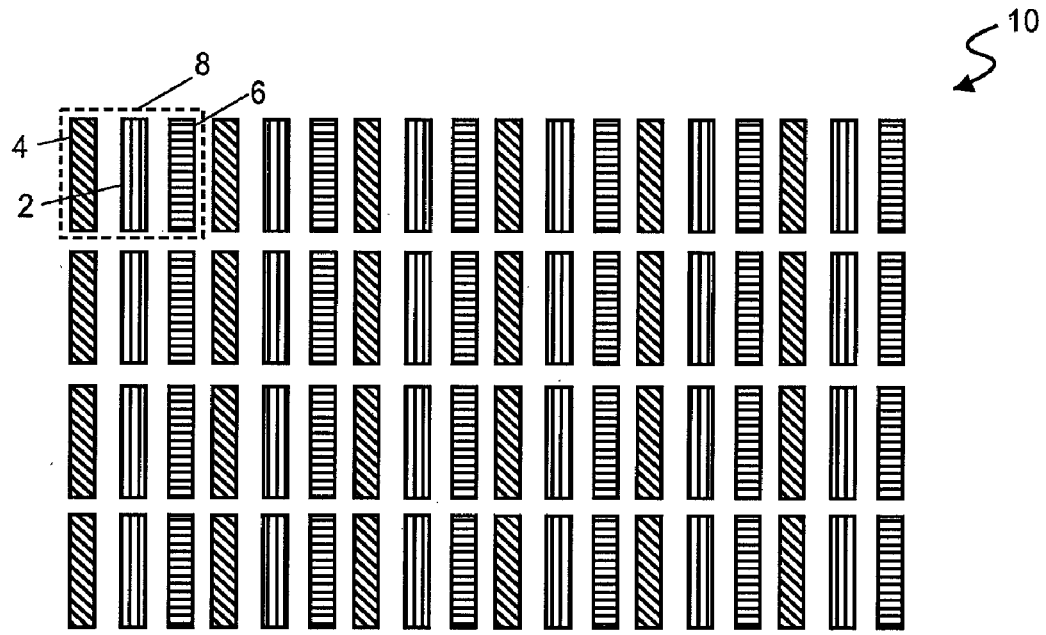
FIG. 1 illustrates a prior art RGB stripe arrangement of three-color pixel elements in an array, a single plane, for a display device.
Figure 2:
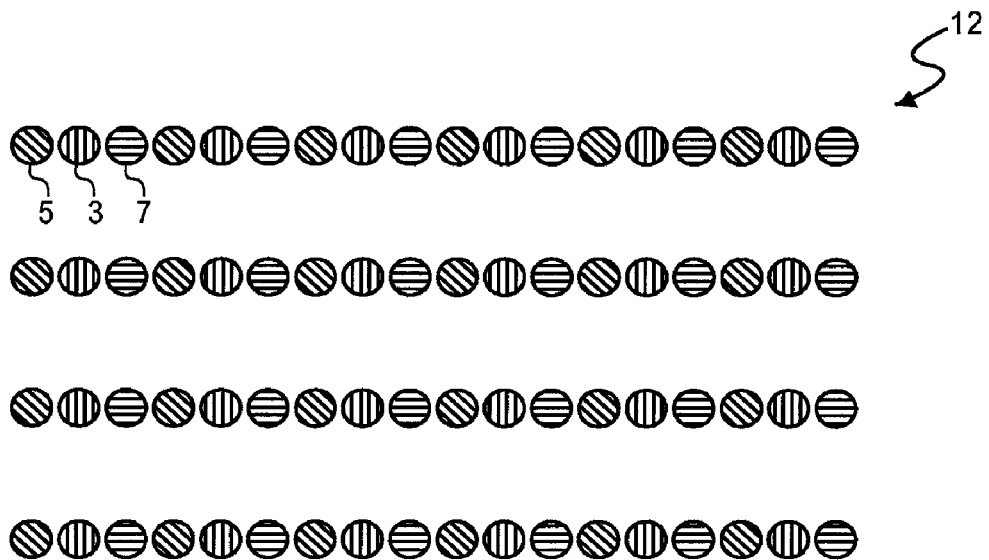
FIG. 2 illustrates the effective sub-pixel rendering sampling points for the prior art RGB stripe arrangement of FIG. 1.
Figure 3:
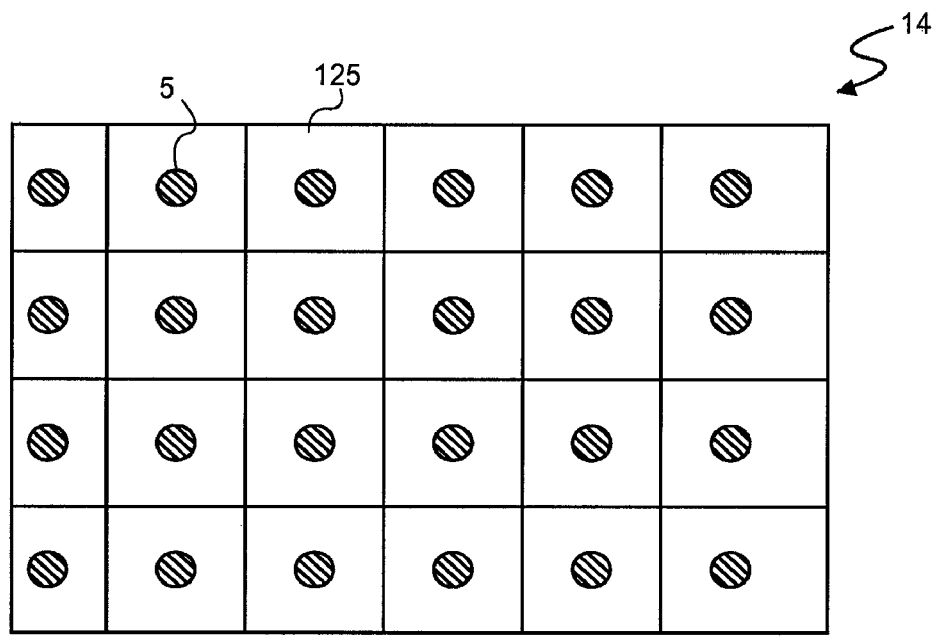
FIGS. 3, 4, and 5 illustrate the effective sub-pixel rendering sampling area for each color plane of the sampling points for the prior art RGB stripe arrangement of FIG. 1.
Figure 4:
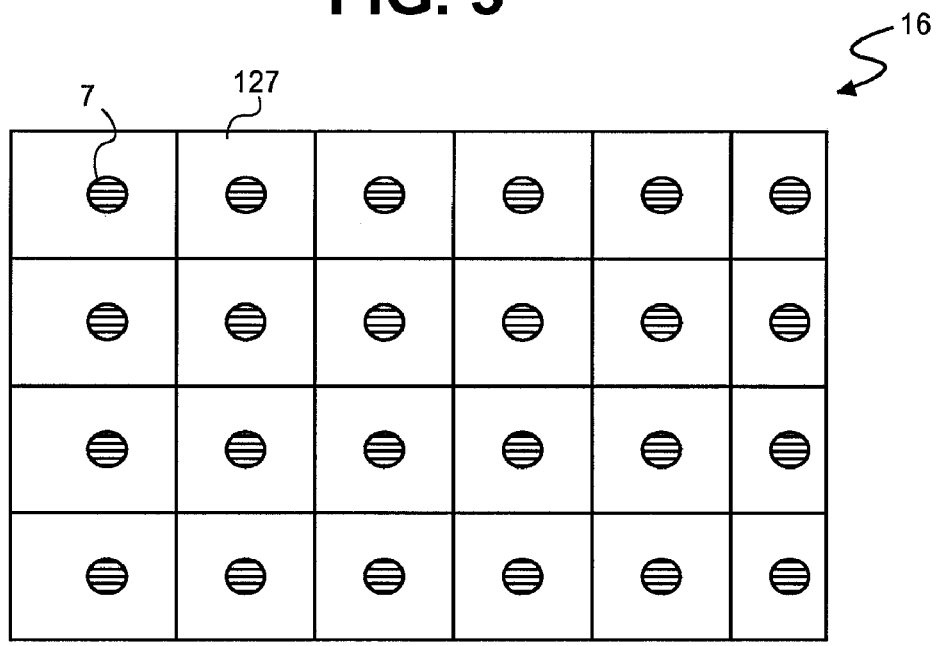
Figure 5:
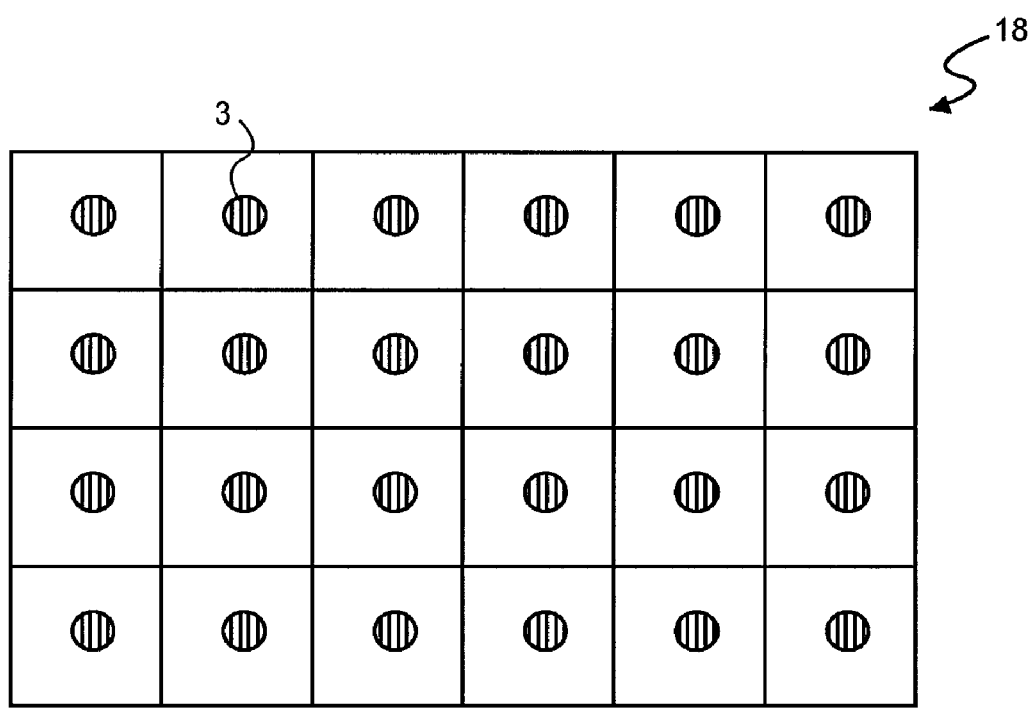

FIG. 1 illustrates a prior art RGB stripe arrangement of three-color pixel elements in an array, a single plane, for a display device and prior art FIG. 2 illustrates the effective sub-pixel rendering sampling points for the prior art RGB stripe arrangement of FIG. 1. Prior art FIGS. 3, 4, and 5 illustrate the effective sub-pixel rendering sampling area for each color plane of the sampling points for the prior art RGB stripe arrangement of FIG. 1. FIGS. 1-5 will be discussed further herein.

Figure 6:
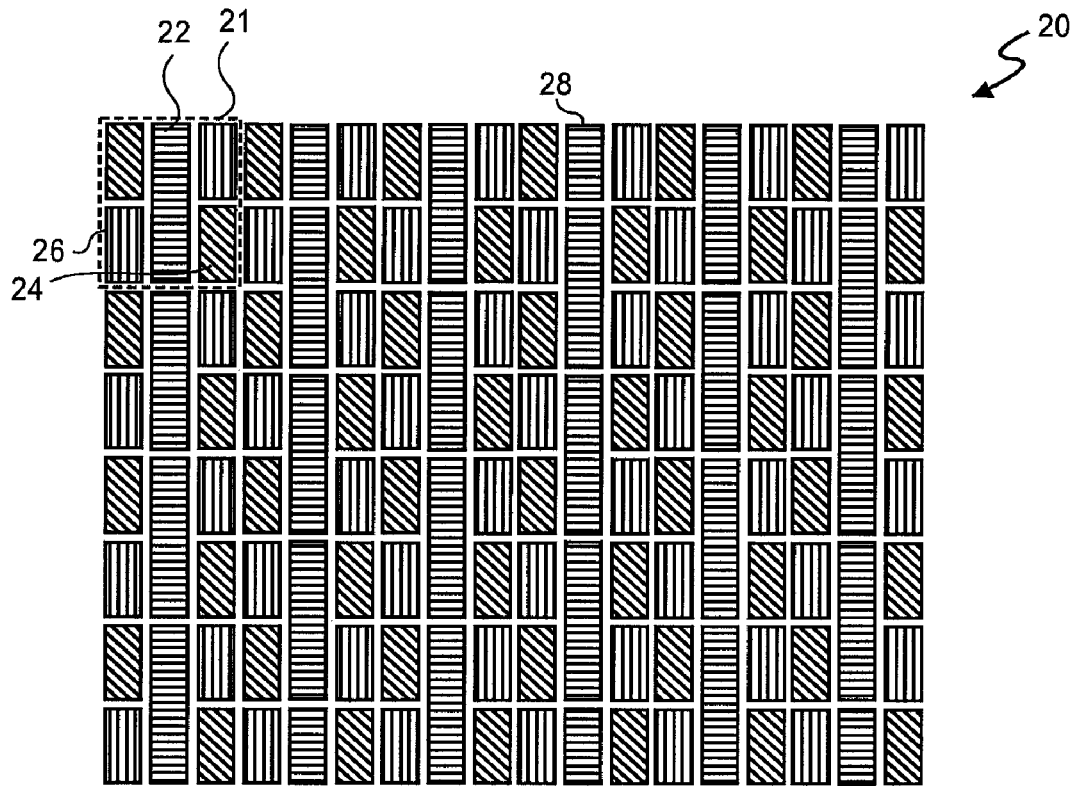
FIG. 6 illustrates an arrangement of three-color pixel elements in an array, in a single plane, for a display device.

FIG. 6 illustrates an arrangement 20 of several three-color pixel elements according to one embodiment. The three-color pixel element 21 is square-shaped and disposed at the origin of an X, Y coordinate system and comprises a blue emitter 22, two red emitters 24, and two green emitters 26. The blue emitter 22 is disposed at the center, vertically along the X axis, of the coordinate system extending into the first, second, third, and fourth quadrants. The red emitters 24 are disposed in the second and fourth quadrants, not occupied by the blue emitter. The green emitters 26 are disposed in the first and third quadrants, not occupied by the blue emitter. The blue emitter 22 is rectangular-shaped, having sides aligned along the X and Y axes of the coordinate system, and the opposing pairs of red 24 and green 26 emitters are generally square-shaped.

The array is repeated across a panel to complete a device with a desired matrix resolution. The repeating three-color pixel elements form a "checker board" of alternating red 24 and green 26 emitters with blue emitters 22 distributed evenly across the device, but at half the resolution of the red 24 and green 26 emitters. Every other column of blue emitters is staggered, or shifted by half of its length, as represented by emitter 28. To accommodate this and because of edge effects, some of the blue emitters are half-sized blue emitters 28 at the edges.

Figure 7:
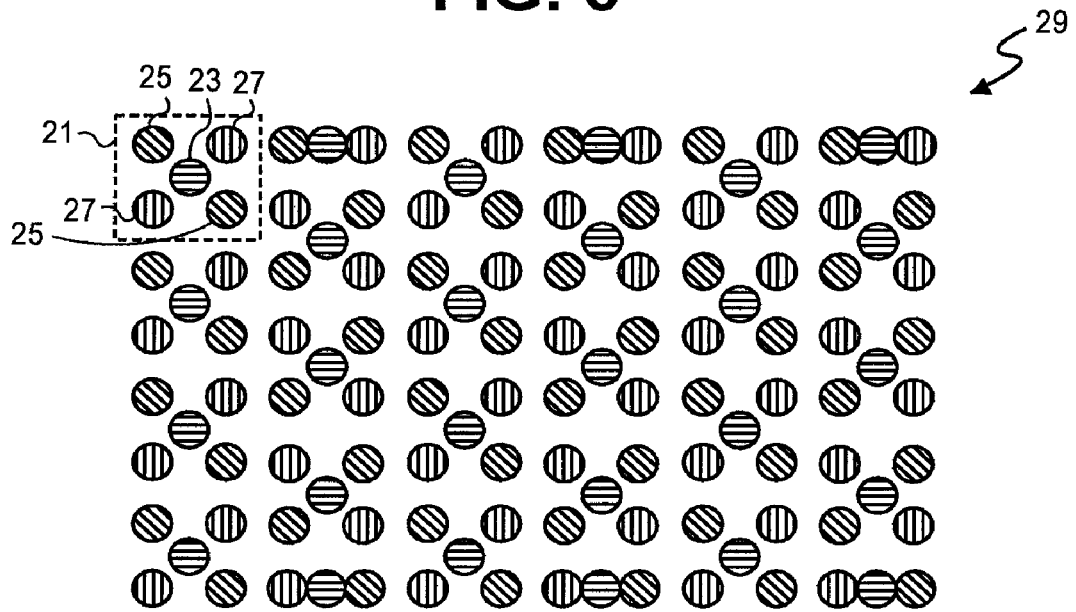
FIG. 7 illustrates the effective sub-pixel rendering sampling points for the arrangements of FIGS. 6 and 27.
Figure 8:
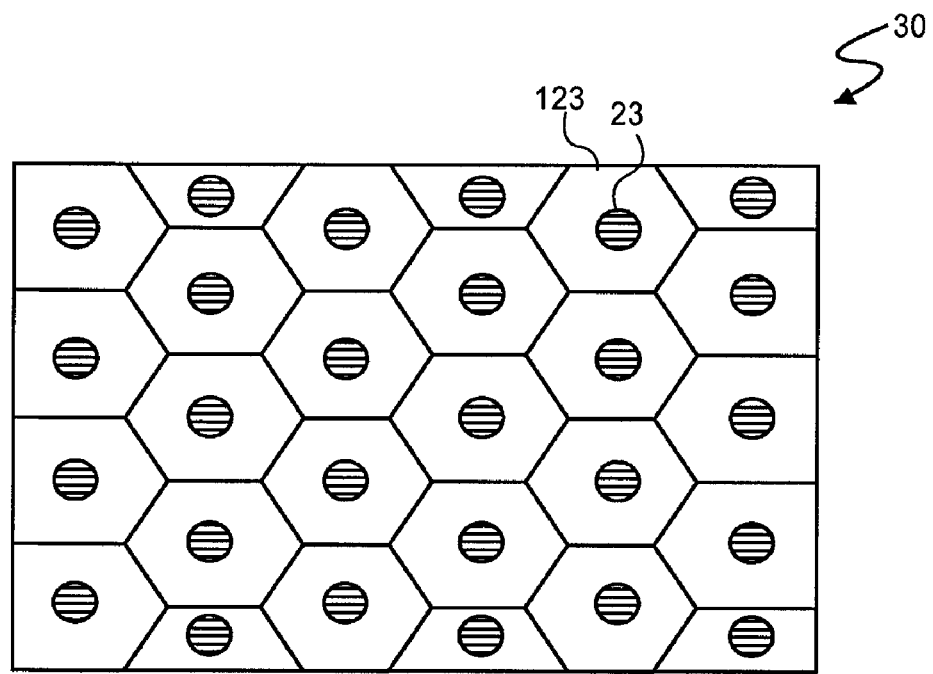
FIGS. 8 and 9 illustrate alternative effective sub-pixel rendering sampling areas for the blue color plane sampling points for the arrangements of FIGS. 6 and 27.
Figure 9:
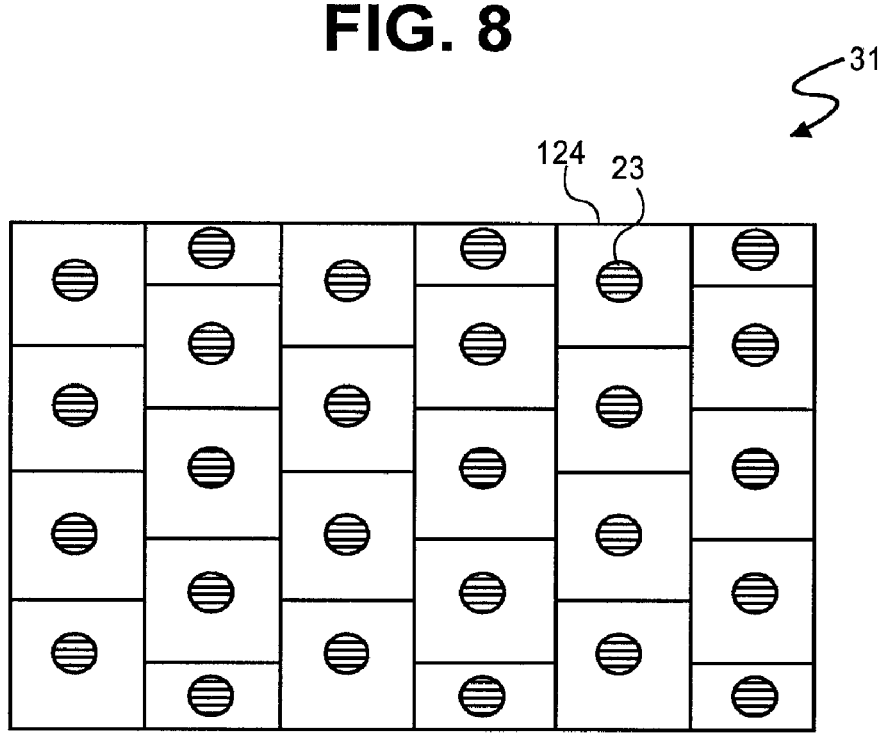
Figure 27:
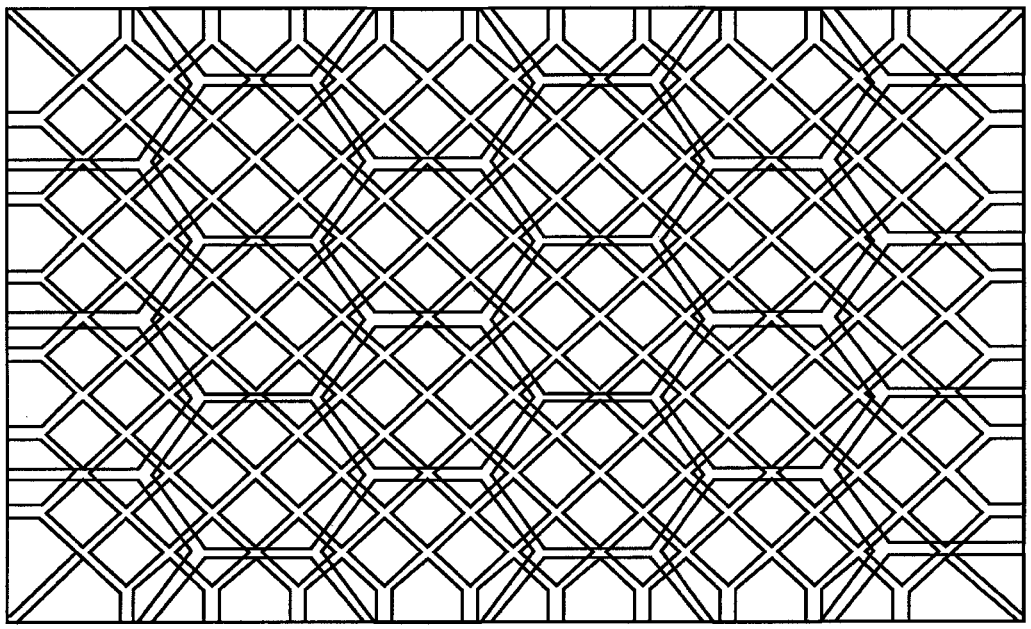
FIG. 27 illustrates another arrangement of three-color pixel elements in an array, in three panels, for a display device.

FIG. 7 illustrates an arrangement 29 of the effective sub-pixel rendering sampling points for the arrangements of FIGS. 6 and 27, while FIGS. 8 and 9 illustrate arrangements 30, 31 of alternative effective sub-pixel rendering sampling areas 123, 124 for the blue color plane sampling points 23 for the arrangements of FIGS. 6 and 27. FIGS. 7, 8, and 9 will be discussed further herein.

Figure 10:
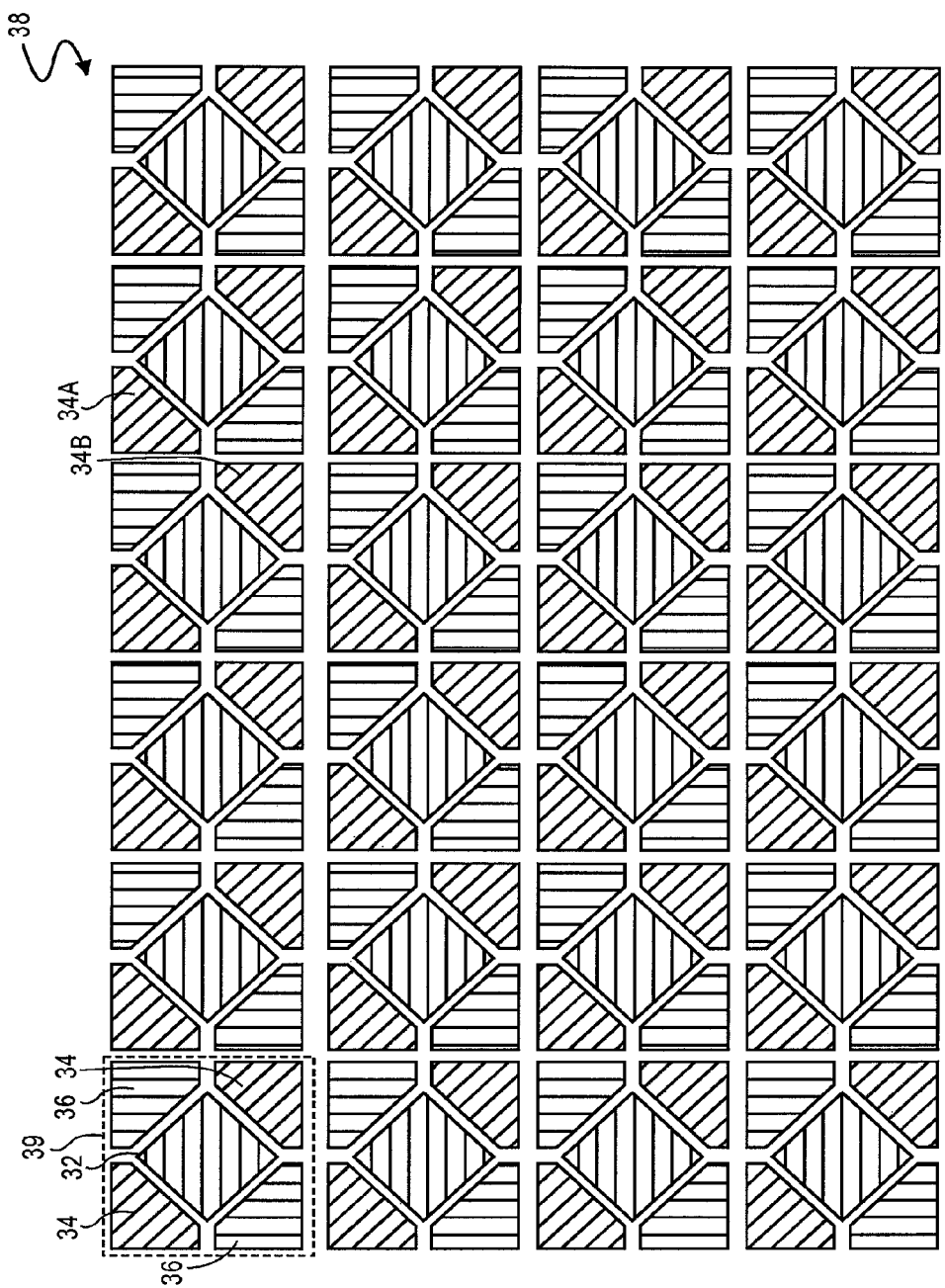
FIG. 10 illustrates another arrangement of three-color pixel elements in an array, in a single plane, for a display device.

FIG. 10 illustrates an alternative illustrative embodiment of an arrangement 38 of three-color pixel elements 39. The three-color pixel element 39 consists of a blue emitter 32, two red emitters 34, and two green emitters 36 in a square. The three-color pixel element 39' is square shaped and is centered at the origin of an X, Y coordinate system. The blue emitter 32 is centered at the origin of the square and extends into the first, second, third, and fourth quadrants of the X, Y coordinate system. A pair of red emitters 34 are disposed in opposing quadrants (i.e., the second and the fourth quadrants), and a pair of green emitters 36 are disposed in opposing quadrants (i.e., the first and the third quadrants), occupying the portions of the quadrants not occupied by the blue emitter 32. As shown in FIG. 10, the blue emitter 32 is diamond shaped, having corners aligned at the X and Y axes of the coordinate system, and the opposing pairs of red 34 and green 36 emitters are generally square shaped, having truncated inwardly-facing corners forming edges parallel to the sides of the blue emitter 32.

The array is repeated across a panel to complete a device with a desired matrix resolution. The repeating three-color pixels form a "checker board" of alternating red 34 and green 36 emitters with blue emitters 32 distributed evenly across the device, but at half the resolution of the red 34 and green 36 emitters. Red emitters 34a and 34b will be discussed further herein.

One advantage of the three-color pixel element array is an improved resolution of color displays. This occurs since only the red and green emitters contribute significantly to the perception of high resolution in the luminance channel. Thus, reducing the number of blue emitters and replacing some with red and green emitters improves resolution by more closely matching to human vision.

Dividing the red and green emitters in half in the vertical axis to increase spatial addressability is an improvement over the conventional vertical single color stripe of the prior art. An alternating "checker board" of red and green emitters allows high spatial frequency resolution, to increase in both the horizontal and the vertical axes.

Figure 11:
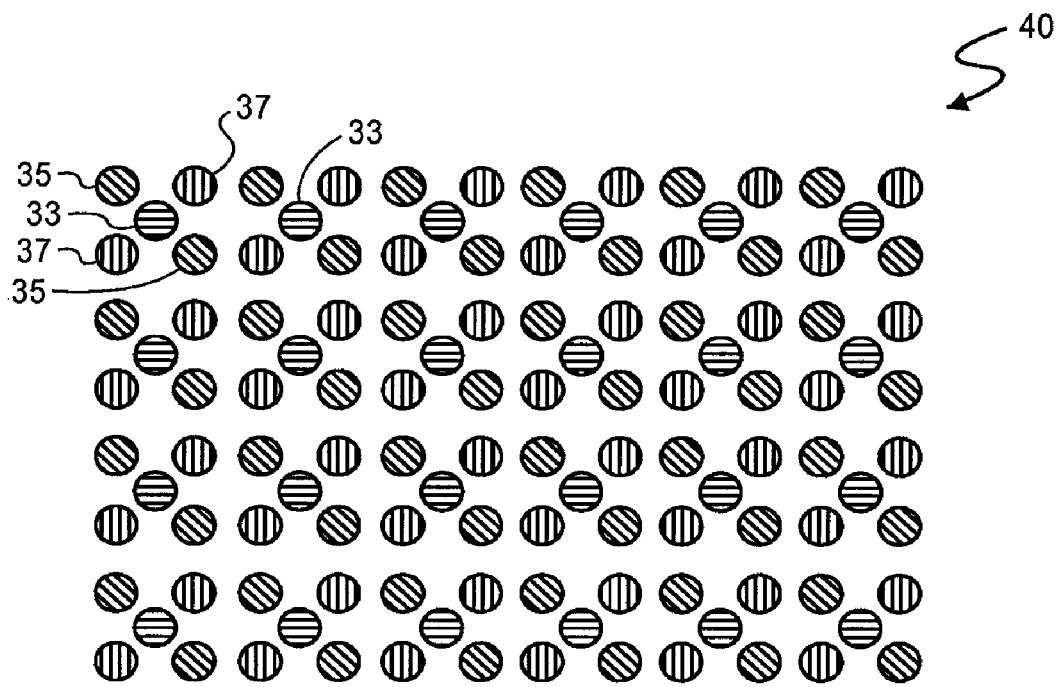
FIG. 11 illustrates the effective sub-pixel rendering sampling points for the arrangement of FIG. 10.
Figure 12:
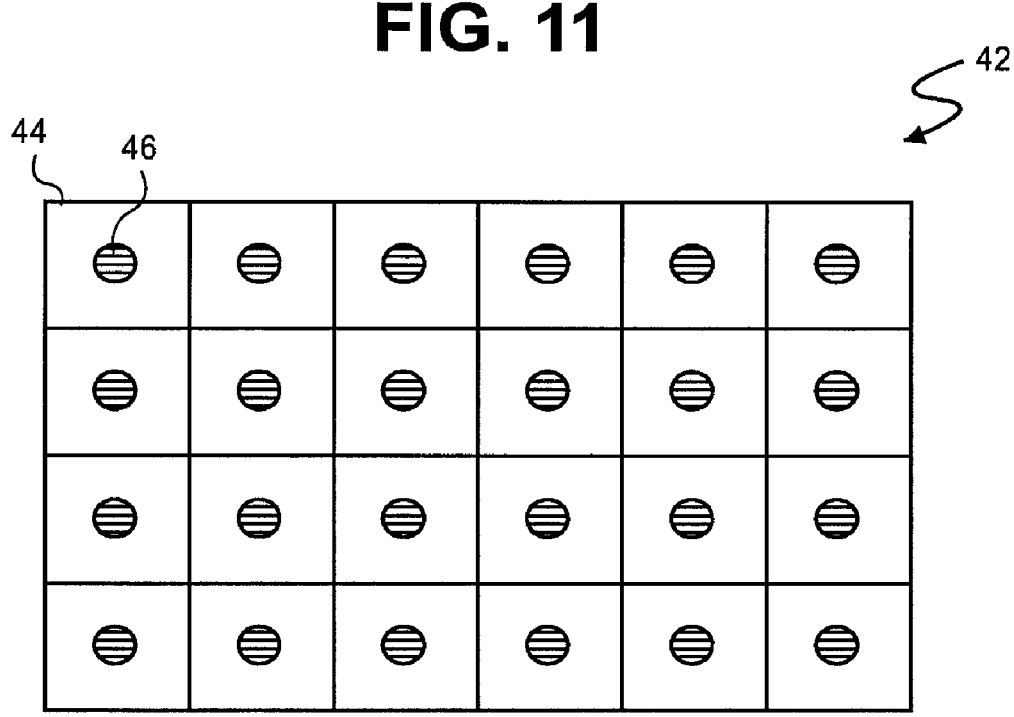
FIG. 12 illustrates the effective sub-pixel rendering sampling areas for the blue color plane sampling points for the arrangement of FIG. 10.

In order to reconstruct the image of the first data format onto the display of the second data format, sample areas need to be defined by isolating reconstruction points in the geometric center of each emitter and creating a sampling grid. FIG. 11 illustrates an arrangement 40 of the effective reconstruction points for the arrangement 38 of three-color pixel elements 39 of FIG. 10. The reconstruction points 33, 35, and 37 of FIG. 11 are centered over the geometric locations of the emitters 32, 34, and 36, respectively in the three-color pixel element 39 of FIG. 10. The red reconstruction points 35 and the green reconstruction points 37 form a red and green "checker board" array across the display. The blue reconstruction points 33 are distributed evenly across the device, but at half the resolution of the red 35 and green 37 reconstruction points. For sub-pixel rendering, these color reconstruction points are treated as sampling points and are used to construct the effective sampling area for each color plane, which are treated separately. FIG. 12 illustrates the effective blue sampling points 46 (corresponding to blue reconstruction point 33 of FIG. 11) and sampling areas 44 for the blue color plane 42 for the reconstruction array of FIG. 11. For a square grid of reconstruction points, the minimum boundary perimeter is a square grid.

Figure 13:
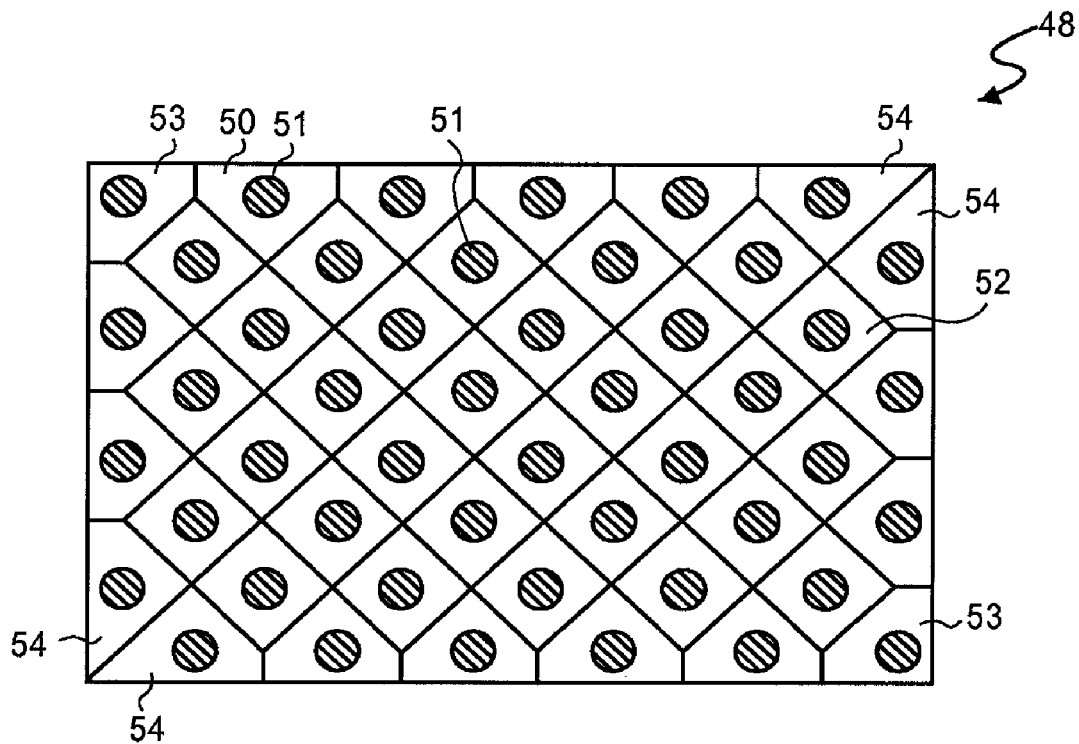
FIGS. 13 and 14 illustrate the effective sub-pixel rendering sampling areas for the red and green color planes for the arrangements of both FIGS. 6 and 10.

FIG. 13 illustrates the effective red sampling points 51 that correspond to the red reconstruction points 35 of FIG. 11 and to the red reconstruction points 25 of FIG. 7, and the effective sampling areas 50, 52, 53, and 54 for the red color plane 48. The sampling points 51 form a square grid array at 45° to the display boundary. Thus, within the central array of the sampling grid, the sampling areas form a square grid. Because of 'edge effects' where the square grid would overlap the boundary of the display, the shapes are adjusted to keep the same area and minimize the boundary perimeter of each sample (e.g., 54). Inspection of the sample areas will reveal that sample areas 50 have the same area as sample areas 52, however, sample areas 54 has slightly greater area, while sample areas 53 in the corners have slightly less. This does introduce an error, in that the varying data within the sample areas 53 will be over represented while varying data in sample areas 54 will be under represented. However, in a display of hundreds of thousands to millions of emitters, the error will be minimal and lost in the corners of the image.

Figure 14:
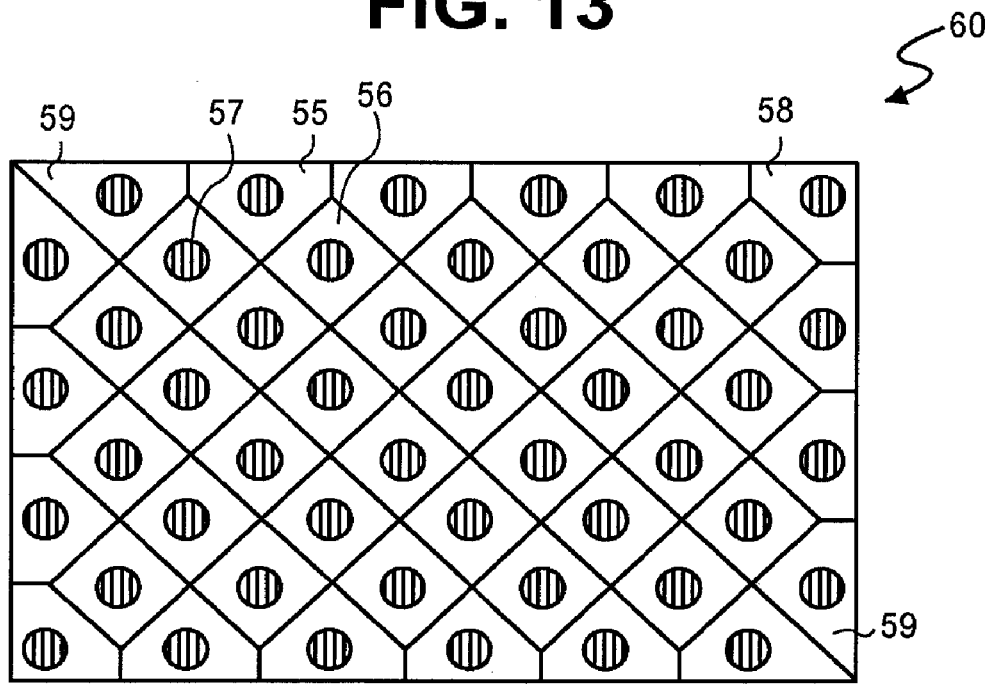

FIG. 14 illustrates the effective green sampling points 57 that correspond to the green reconstruction points 37 of FIG. 11 and to the green reconstruction points 27 of FIG. 7, and the effective sampling areas 55, 56, 58, and 59 for the green color plane 60. Inspection of FIG. 14 will reveal it is essential similar to FIG. 13, it has the same sample area relationships, but is rotated by 180°.

These arrangements of emitters and their resulting sample points and areas would best be used by graphics software directly to generate high quality images, converting graphics primitives or vectors to offset color sample planes, combining prior art sampling techniques with the sampling points and areas. Complete graphics display systems, such as portable electronics, laptop and desktop computers, and television/video systems, would benefit from using flat panel displays and these data formats. The types of displays utilized can include, but is not limited to, liquid crystal displays, subtractive displays, plasma panel displays, electro-luminecence (EL) displays, electrophoretic displays, field emitter displays, discrete light emitting diode displays, organic light emitting diodes (OLEDs) displays, projectors, cathode ray tube (CRT) displays, and the like, and combinations comprising at least one of the foregoing displays. However, much of the installed base of graphics and graphics software uses a legacy data sample format originally based on the use of CRTs as the reconstruction display.

Figure 15:
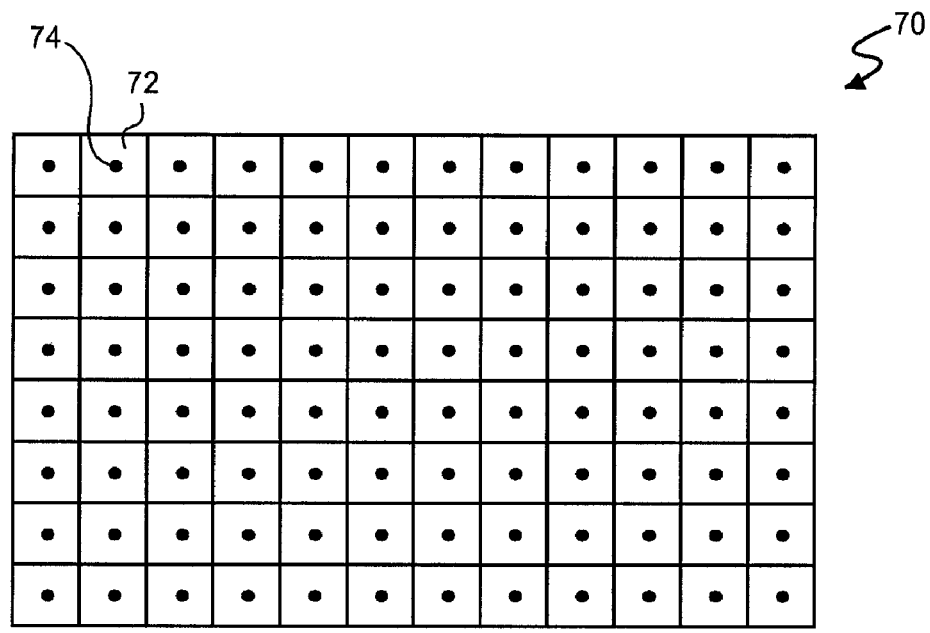
FIG. 15 illustrates an array of sample points and their effective sample areas for a prior art pixel data format, in which the red, green, and blue values are on an equal spatial resolution grid and co-incident.

FIG. 15 illustrates an array 70 of sample points 74 and their effective sample areas 72 for a prior art pixel data format in which the red, green, and blue values are on an equal spatial resolution grid and co-incident. In prior art display systems, this form of data was reconstructed on a flat panel display by simply using the data from each color plane on a prior art RGB stripe panel of the type shown in FIG. 1. In FIG. 1, the resolution of each color sub-pixel was the same as the sample points, treating three sub-pixels in a row as though they constituted a single combined and intermingled multi-color pixel while ignoring the actual reconstruction point positions of each color sub-pixel. In the art, this is often referred to as the "Native Mode" of the display. This wastes the positional information of the sub-pixels, especially the red and green.

In contrast, the incoming RGB data of the present application is treated as three planes over lying each other. To covert the data from the RGB format, each plane is treated separately. Displaying information from the original prior art format on the more efficient sub-pixel arrangements of the present application requires a conversion of the data format via resampling. The data is resampled in such a fashion that the output of each sample point is a weighting function of the input data. Depending on the spatial frequency of the respective data samples, the weighting function may be the same, or different, at each output sample point, as will be described below.

Figure 16:
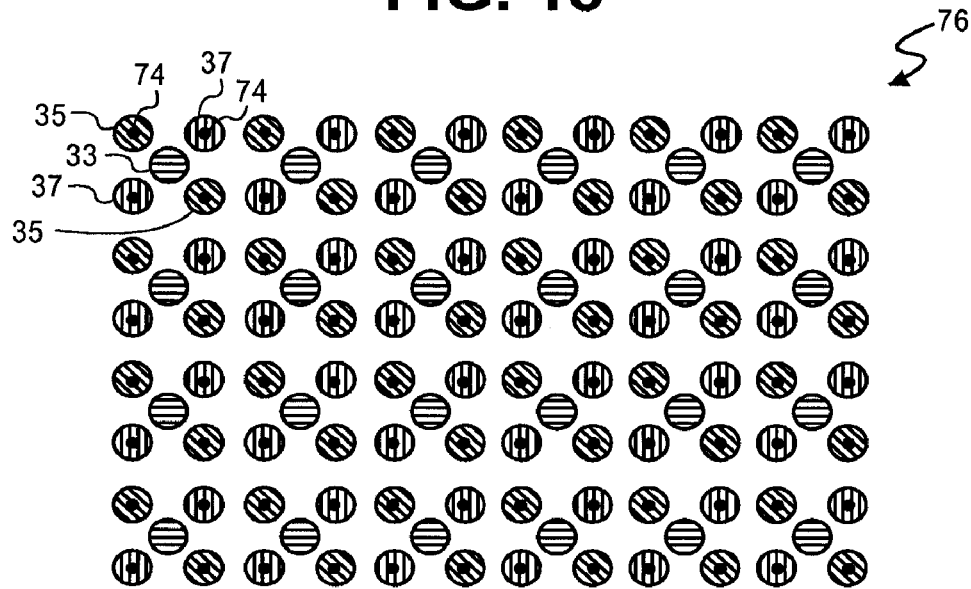
FIG. 16 illustrates the array of sample points of prior art FIG. 15 overlaid on the sub-pixel rendered sample points of FIG. 11, in which the sample points of FIG. 15 are on the same spatial resolution grid and co-incident with the red and green "checker board" array of FIG. 11.

FIG. 16 illustrates the arrangement 76 of sample points 74 of FIG. 15 overlaid on the effective reconstruction points 33, 35, and 37 of FIG. 11, in which the sample points 74 of FIG. 15 are on the same spatial resolution grid and co-incident with the red (red reconstruction points 35) and green (green reconstruction points 37) "checker board" array of FIG. 11.

Figure 17:
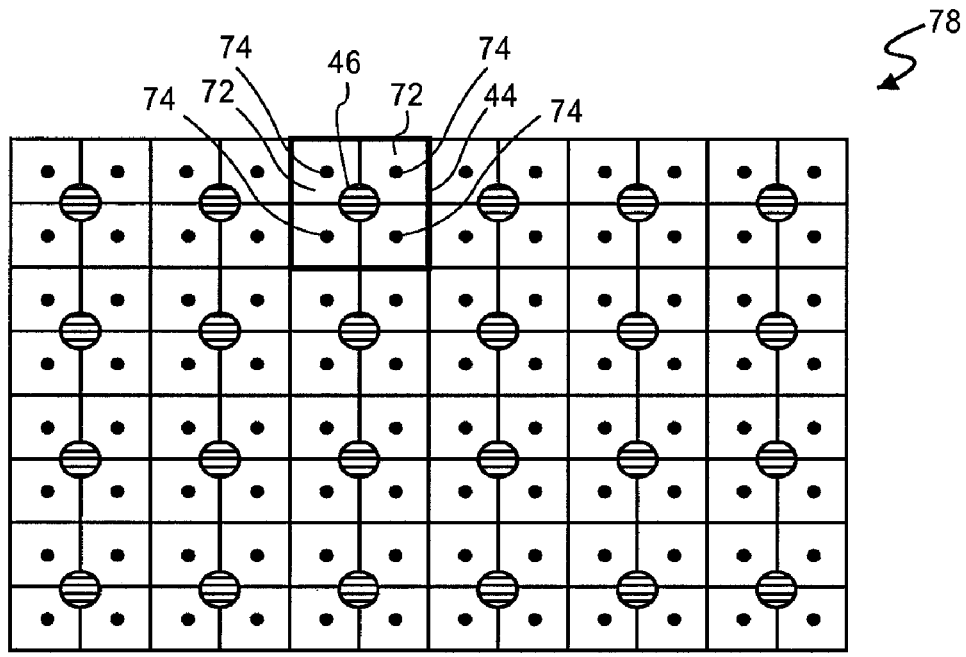
FIG. 17 illustrates the array of sample points and their effective sample areas of prior art FIG. 15 overlaid on the blue color plane sampling areas of FIG. 12, in which the sample points of prior art FIG. 15 are on the same spatial resolution grid and co-incident with the red and green "checker board" array of FIG. 11.

FIG. 17 illustrates the arrangement 78 of sample points 74 and their effective sample areas 72 of FIG. 15 overlaid on the blue color plane sampling points 46 of FIG. 12, in which the sample points 74 of FIG. 15 are on the same spatial resolution grid and co-incident with the red (red reconstruction points 35) and green (green reconstruction points 37) "checker board" array of FIG. 11. FIG. 17 will be discussed further herein.

Figure 18:
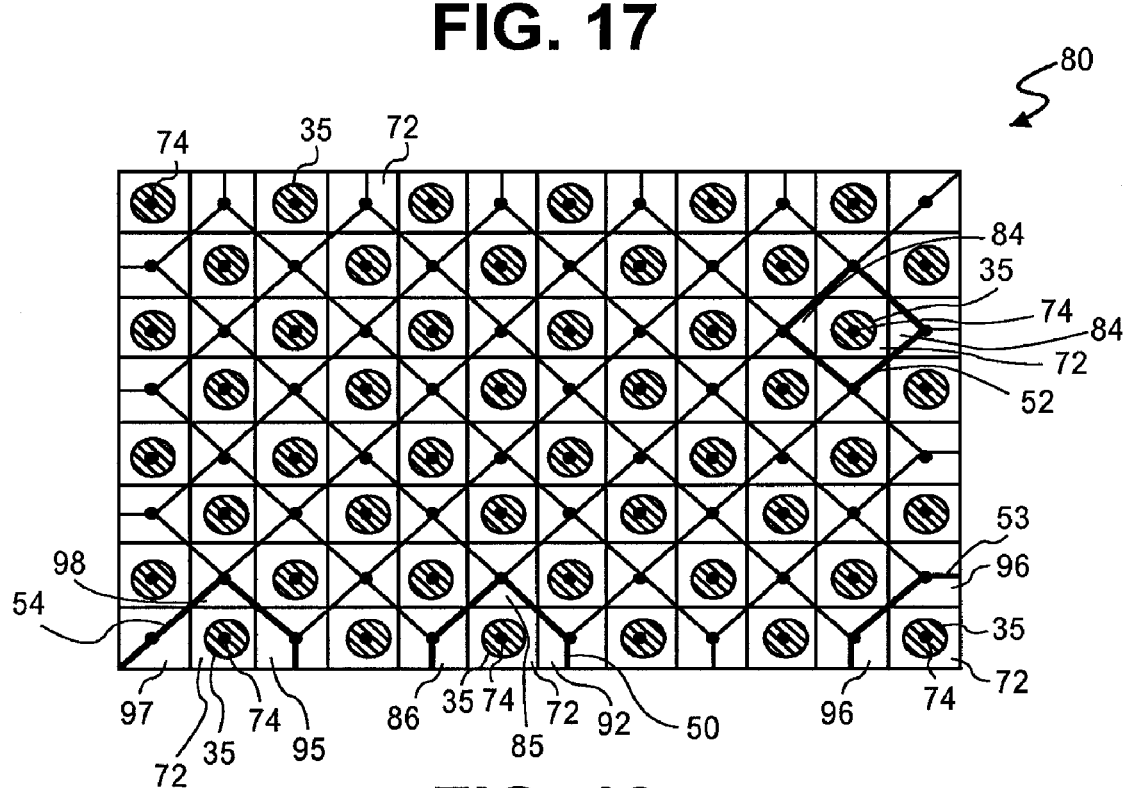
FIG. 18 illustrates the array of sample points and their effective sample areas of prior art FIG. 15 overlaid on the red color plane sampling areas of FIG. 13, in which the sample points of prior art FIG. 15 are on the same spatial resolution grid and co-incident with the red and green "checker board" array of FIG. 11.

FIG. 18 illustrates the array 80 of sample points 74 and their effective sample areas 72 of FIG. 15 overlaid on the red color plane reconstruction points 35 and the red output sample areas 50, 52, 53, and 54 of FIG. 13, in which the sample points 74 of FIG. 15 are on the same spatial resolution grid and co-incident with the red (red reconstruction points 35) and green (green reconstruction points 37) "checker board" array of FIG. 11. Each of the inner array of square red sample areas 52 completely covers the coincident original sample point 74 and its sample area 72 as well as extending to cover one quarter each of the surrounding sample areas 84 that lie inside the sample area 52. To determine the algorithm, the fraction of coverage, or overlap, of the output sample area 50, 52, 53, or 54 over the input sample area 72 is recorded and then multiplied by the value of that corresponding sample point 74 and applied to the red reconstruction point 35. In FIG. 18, the area of red output sample area 52 filled by the central, or coincident, input sample area 72 is half of square sample area 52. Thus, the value of the corresponding sample point 74 is multiplied by one half (or 0.5). By inspection, the area of square sample area 52 filled by each of the surrounding, non-coincident, input areas 84 is one eighth (or 0.125) each. Thus, the value of the corresponding four input sample points 74 is multiplied by one eighth (or 0.125). These values are then added to the previous value (e.g., that was multiplied by 0.5) to find the final output value of a given red reconstruction point 35 in sample area 52.

For the red reconstruction points 35 on the edges and their five sided sample areas 50, the coincident input sample area 72 is completely covered as in the case described above, but only three surrounding input sample areas 85, 86, and 92 are overlapped. One of the overlapped input sample areas 85 represents one eighth of the output sample area 50. The neighboring input sample areas 86 and 92 along the edge represent three sixteenths ($^3/_{16}$=0.1875) of the output area each. As before, the weighted values of the input values 74 from the overlapped sample areas 72 are added to give the value for red reconstruction point 35 in sample area 50.

The corners and "near" corners are treated the same. Since the areas of the image that the corner sample areas 53 and "near" corner sample areas 54 cover are different than the central sample areas 52 and edge sample areas 50, the weighting of the relevant input sample areas will be different than those previously described. For the smaller corner output sample areas 53, the coincident input sample area 72 covers four sevenths (or about 0.5714) of output sample area 53. The neighboring input sample areas 96 cover three fourteenths (or about 0.2143) of the output sample area 53. For the "near" corner sample areas 54, the coincident input sample area 72 covers eight seventeenths (or about 0.4706) of the output sample area 54. The inward neighboring sample area 98 covers two seventeenths (or about 0.1176) of the output sample area 54. The edge wise neighboring input sample area 95 covers three seventeenths (or about 0.1765) of the output sample area 54. The corner input sample area 97 covers four seventeenths (or about 0.2353) of the output sample area 54. As before, the weighted values of the input values 74 from the overlapped sample areas 72 are added to give the value for red reconstruction point 35.

The calculation for the resampling of the green color plane proceeds in a similar manner, but the output sample array is rotated by 180°.

To restate, the calculations for the red sample point 35 and green sample point 37 values, $V_{out}$, are as follows Central Areas:

$$V_{out}(C_xR_y)=0.5\_V_{in}(C_xR_y)+0.125\_V_{in}(C_{x-1}R_y)+ 0.125\_V_{in}(C_xR_{y+1})+0.125\_V_{in}(C_{x+1}R_y)+0.125\_V_{in}(C_xR_{y-1})$$

Lower Edge:

$$V_{out}(C_xR_y)=0.5\_V_{in}(C_xR_y)+0.1875\_V_{in}(C_{x-1}R_y)+ 0.1875\_V_{in}(C_xR_{y+1})+0.125\_V_{in}(C_{x+1}R_y)$$

Upper Edge:

$$V_{out}(C_xR_1)=0.5\_V_{in}(C_xR_1)+0.1875\_V_{in}(C_{x-1}R1)+ 0.125\_V_{in}(C_xR_2)+0.1875\_V_{in}(C_{x+1}R1)$$

Right Edge:

$$V_{out}(C_xR_y)=0.5\_V_{in}(C_xR_y)+0.125\_V_{in}(C_{x-1}R_y)+ 0.1875\_V_{in}(C_xR_{y+1})+0.1875\_V_{in}(C_xR_{y-1})$$

Left Edge $$V_{out}(C_1R_y)=0.5\_V_{in}(C_1R_y)+0.1875\_V_{in}(C_1R_{y+1})+ 0.125\_V_{in}(C_2R_y)+0.1875\_V_{in}(C_1R_{y-1})$$

Upper Right Hand Corner:

$$V_{out}(C_xR_y)=0.5714\_V_{in}(C_xR_y)+0.2143\_V_{in}(C_{x-1}R_y)+ 0.2143\_V_{in}(C_xR_{y+1})$$

Upper Left Hand Corner:

$$V_{out}(C_1R_1)=0.5714\_V_{in}(C_1R_1)+0.2143\_V_{in}(C_1R_2)+ 0.2143\_V_{in}(C_2R_1)$$

Lower Left Hand Corner:

$$V_{out}(C_xR_y)=0.5714\_V_{in}(C_xR_y)+0.2143\_V_{in}(C_{x+1}R_y)+ 0.2143\_V_{in}(C_xR_{y-1})$$

Lower Right Hand Corner:

$$V_{out}(C_xR_y)=0.5714\_V_{in}(C_xR_y)+0.2143\_V_{in}(C_{x+1}R_y)+ 0.2143\_V_{in}(C_xR_{y-1})$$

Upper Edge, Left Hand Near Corner:

$$V_{out}(C_2R_1)=0.4706\_V_{in}(C_2R_1)+0.2353\_V_{in}(C_1R_1)+ 0.1176\_V_{in}(C_2R_2)+0.1765\_V_{in}(C_3R_1)$$

Left Edge, Upper Near Corner:

$$V_{out}(C_1R_2) = 0.4706\_V_{in}(C_1R_2) + 0.1765\_V_{in}(C_1R_3) + 0.1176\_V_{in}(C_2R_2) + 0.2353\_V_{in}(C_1R_1)$$

Left Edge Lower Near Corner:

$$V_{out}(C_1R_y) = 0.4706\_V_{in}(C_1R_y) + 0.2353\_V_{in}(C_1R_{y+1}) + 0.1176\_V_{in}(C_2R_y) + 0.1765\_V_{in}(C_1R_{y-1})$$

Lower Edge, Left Hand Near Corner:

$$V_{out}(C_2R_y) = 0.4706\_V_{in}(C_2R_y) + 0.2353\_V_{in}(C_1R_y) + 0.1765\_V_{in}(C_3R_y) + 0.1176\_V_{in}(C_2R_{y-1}) + 0.125\_V_{in}(C_xR_{y-1})$$

Lower Edge, Right Hand Near Corner:

$$V_{out}(C_1R_y) = 0.4706\_V_{in}(C_xR_y) + 0.1765\_V_{in}(C_{x-1}R_y) + 0.2353\_V_{in}(C_{x+1}R_y) + 0.1176\_V_{in}(C_xR_{y-1})$$

Right Edge, Lower Near Corner:

$$V_{out}(C_xR_y) = 0.4706\_V_{in}(C_xR_y) + 0.1176\_V_{in}(C_{x-1}R_y) + 0.2353\_V_{in}(C_xR_{y+1}) + 0.1765\_V_{in}(C_xR_{y-1})$$

Right Edge, Upper Near Corner:

$$V_{out}(C_xR_2) = 0.4706\_V_{in}(C_xR_2) + 0.1176\_V_{in}(C_{x-1}R_2) + 0.1765\_V_{in}(C_xR_3) + 0.2353\_V_{in}(C_xR_1)$$

Upper Edge, Right Hand Near Corner:

$$V_{out}(C_xR_1) = 0.4706\_V_{in}(C_xR_1) + 0.1765\_V_{in}(C_{x-1}R_1) + 0.1176\_V_{in}(C_xR_2) + 0.2353\_V_{in}(C_{x+1}R_1)$$

where $V_{in}$ are the chrominance values for only the color of the subpixel at $C_xR_y$ ($C_x$ represents the $x^{th}$ column of red 34 and green 36 sub-pixels and $R_y$ represents the $y^{th}$ row of red 34 and green 36 sub-pixels, thus $C_xR_y$ represents the red 34 or green 36 sub-pixel emitter at the $x^{th}$ column and $y^{th}$ row of the display panel, starting with the upper left-hand corner, as is conventionally done). It is important to note that the total of the coefficient weights in each equation add up to a value of one. Although there are seventeen equations to calculate the full image conversion, because of the symmetry there are only four sets of coefficients. This reduces the complexity when implemented.

As stated earlier, FIG. 17 illustrates the arrangement 78 of sample points 74 and their effective sample areas 72 of FIG. 15 overlaid on the blue color plane sampling points 46 of FIG. 12, in which the sample points 74 of FIG. 15 are on the same spatial resolution grid and co-incident with the red (red reconstruction points 35) and green (green reconstruction points 37) "checker board" array of FIG. 11. The blue sampling points 46 of FIG. 12 allow each blue sample area 44 (shown in bold) to be determined by inspection. In this case, the blue sample area 44 is now a blue resample area which is simply the arithmetic mean of the surrounding blue values of the original data sample points 74 that is computed as the value for the blue sampling point 46 of the resampled image.

The blue output value, $V_{out}$, of a blue sampling point 46 is calculated as follows:

$$V_{out}(C_{x+}R_{y+}) = 0.25\_V_{in}(C_xR_y) + 0.25\_V_{in}(C_xR_{y+1}) + 0.25\_V_{in}(C_{x+1}R_y) + 0.25\_V_{in}(C_{x+1}R_{y+1})$$

where Vin are the blue chrominance values of the surrounding input sample points 74; $C_x$ represents the $x^{th}$ column of sample points 74; and $R_y$ represents the $y^{th}$ row of sample points 74, starting with the upper left-hand corner, as is conventionally done.

For the blue sub-pixel calculation, x and y numbers must be odd, as there is only one blue sub-pixel per pairs of red and green sub-pixels. Again, the total of the coefficient weights is equal to a value of one.

The weighting of the coefficients of the central area equation for the red sample point 35, which affects most of the image created, and applying to the central resample areas 52 is the process of binary shift division, where 0.5 is a one bit shift to the "right", 0.25 is a two bit shift to the "right", and 0.125 is a three bit shift to the "right". Thus, the algorithm is extremely simple and fast, involving simple shift division and addition. For greatest accuracy and speed, the addition of the surrounding pixels should be completed first, followed by a single three bit shift to the right, and then the single bit shifted central value is added. However, the latter equations for the red and green sample areas at the edges and the corners involve more complex multiplications. On a small display (e.g., a display having few total pixels), a more complex equation may be needed to ensure good image quality display. For large images or displays, where a small error at the edges and corner may matter very little, a simplification may be made. For the simplification, the first equation for the red and green planes is applied at the edges and corners with the "missing" input data sample points over the edge of the image, such that input sample points 74 are set to equal the coincident input sample point 74. Alternatively, the "missing" values may be set to black. This algorithm may be implemented with case in software, firmware, or hardware.

It is important that the chromanance values be linearly additive, meaning that the sub-pixel rendering must be completed before gamma correction. The outputs of the above algorithm may feed into the gamma correction tables. If gamma correction is performed before sub-pixel rendering, unexpected chromanance errors are likely to occur.

Figure 19:
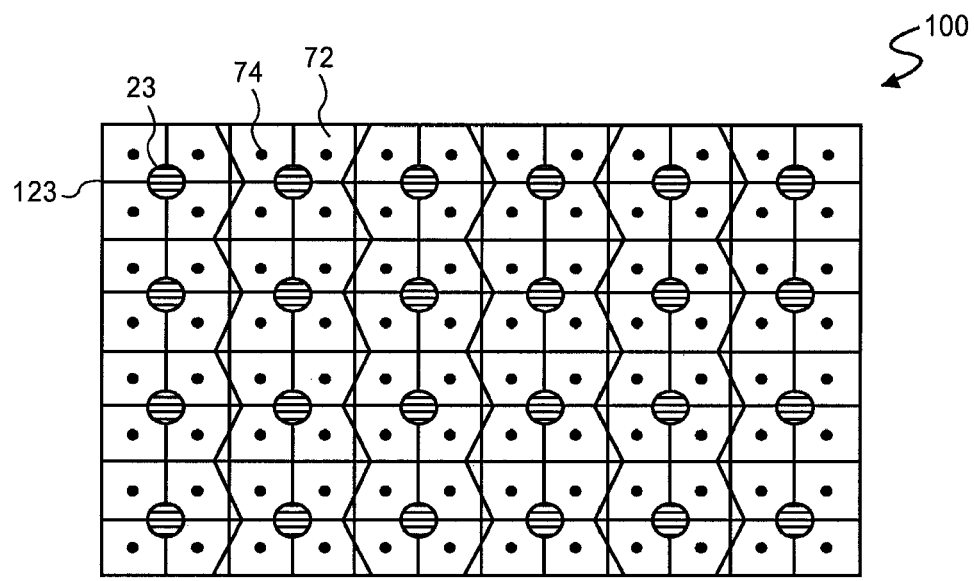
FIGS. 19 and 20 illustrate the array of sample points and their effective sample areas of prior art FIG. 15 overlaid on the blue color plane sampling areas of FIGS. 8 and 9, in which the sample points of prior art FIG. 15 are on the same spatial resolution grid and co-incident with the red and green "checker board" array of FIG. 7.
Figure 20:
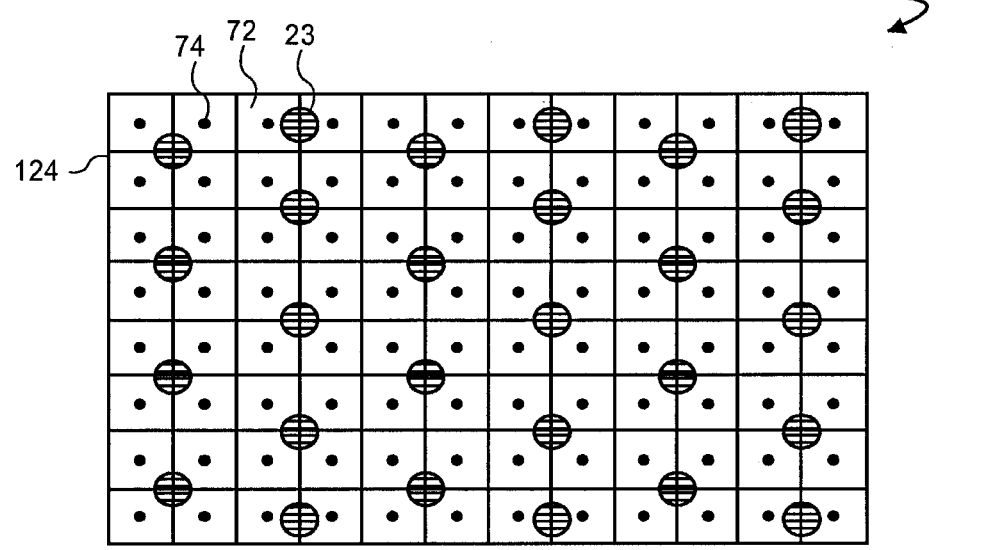

FIGS. 19 and 20 illustrate two alternative arrangements 100, 102 of sample points 74 and their effective sample areas 72 of FIG. 15 overlaid on the blue color plane sampling areas 23 of FIGS. 8 and 9, in which the sample points 74 of FIG. 15 are on the same spatial resolution grid and co-incident with the red and green "checker board" array of FIG. 7. FIG. 8 illustrates the effective sub-pixel rendering sampling areas 123 that have the minimum boundary perimeters for the blue color plane sampling points 23 shown in FIG. 7 for the arrangement of emitters in FIG. 6.

The method for calculating the coefficients proceeds as described above. The proportional overlap of output sample areas 123 in that overlap each input sample area 72 of FIG. 19 are calculated and used as coefficients in a transform equation or filter kernel. These coefficients are multiplied by the sample values 74 in the following transform equation:

$$V_{out}(C_{x+}R_{y+}) = 0.015625\_V_{in}(C_{x-1}R_y) + 0.234375\_V_{in}(C_xR_y) + \\ 0.234375\_V_{in}(C_{x+1}R_y) + 0.015625\_V_{in}(C_{x+2}R_y) + \\ 0.015625\_V_{in}(C_{x-1}R_{y+1}) + 0.234375\_V_{in}(C_xR_{y+1}) + \\ 0.234375\_V_{in}(C_{x+1}R_{y+1}) + 0.015625\_V_{in}(C_{x+2}R_{y+1}).$$

A practitioner skilled in the art can find ways to perform these calculations rapidly. For example, the coefficient 0.015625 is equivalent to a 6 bit shift to the right. In the case where sample points 74 of FIG. 15 are on the same spatial resolution grid and co-incident with the red (red reconstruction points 25) and green (green reconstruction points 27) "checker board" array of FIG. 7, this minimum boundary condition area may lead to both added calculation burden and spreading the data across six sample 74 points.

The alternative effective output sample area 124 arrangement 31 of FIG. 9 may be utilized for some applications or situations. For example, where the sample points 74 of FIG. 15 are on the same spatial resolution grid and co-incident with the red (red reconstruction points 25) and green (green reconstruction points 27) "checker board" array of FIG. 7, or where the relationship between input sample areas 74 and output sample areas is as shown in FIG. 20 the calculations are simpler. In the even columns, the formula for calculating the blue output sample points 23 is identical to the formula developed above for FIG. 17. In the odd columns the calculation for FIG. 20 is as follows:

$$V_{out}(C_{x+\_}R_y) = 0.25\_V_{in}(C_xR_y) + 0.25\_V_{in}(C_{x+1}R_y) + 0.25\_V_{in}(C_xR_{y-1}) + 0.25\_V_{in}(C_{x+1}R_{y-1}).$$

As usual, the above calculations for FIGS. 19 and 20 are done for the general case of the central sample area 124. The calculations at the edges will require modifications to the transform formulae or assumptions about the values of sample points 74 off the edge of the screen, as described above.

Figure 21:
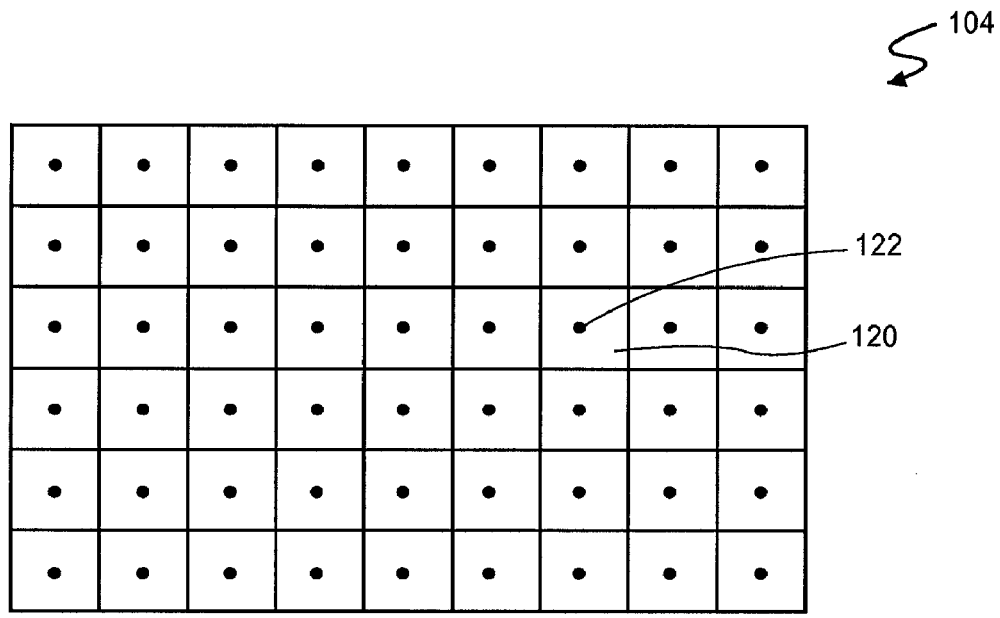
FIG. 21 illustrates an array of sample points and their effective sample areas for a prior art pixel data format in which the red, green, and blue values are on an equal spatial resolution grid and co-incident.

Turning now to FIG. 21, an array 104 of sample points 122 and their effective sample areas 120 for a prior art pixel data format is illustrated. FIG. 21 illustrates the red, green, and blue values that are on an equal spatial resolution grid and co-incident, however, it has a different image size than the image size illustrated in FIG. 15.

Figure 22:
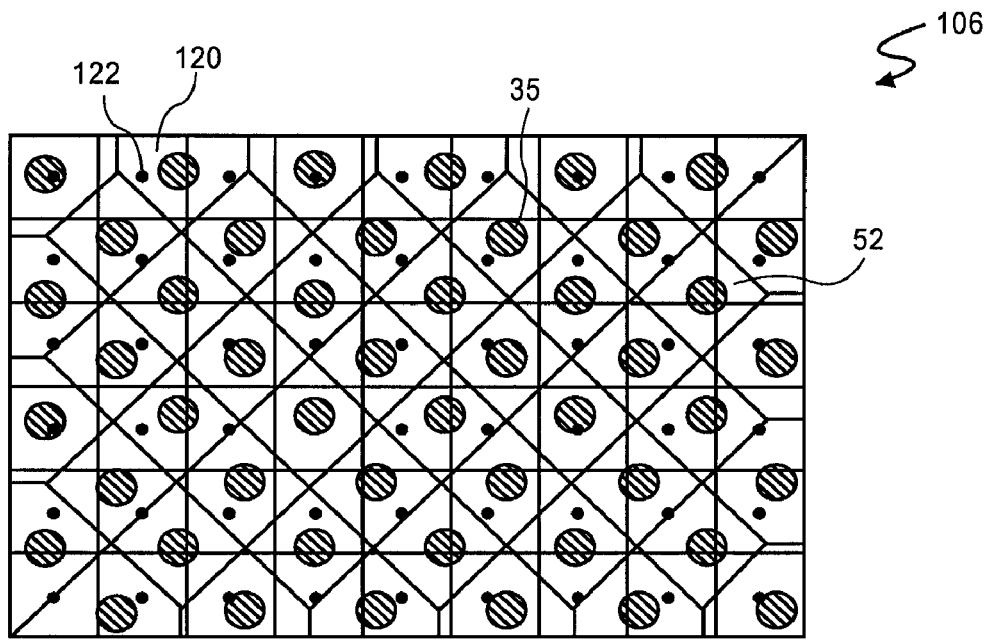
FIG. 22 illustrates the array of sample points and their effective sample areas of prior art FIG. 21 overlaid on the red color plane sampling areas of FIG. 13, in which the sample points of FIG. 21 are not on the same spatial resolution grid and co-incident with the red and green "checker board" array of FIG. 11.

FIG. 22 illustrates an array 106 of sample points 122 and their effective sample areas 120 of FIG. 21 overlaid on the red color plane sampling areas 50, 52, 53, and 54 of FIG. 13. The sample points 122 of FIG. 21 are not on the same spatial resolution grid, nor co-incident with the red (red reconstruction points 25, 35) and green (green reconstruction points 27, 37) "checker board" array of FIG. 7 or 11, respectively.

In this arrangement of FIG. 22, a single simplistic transform equation calculation for each output sample 35 is not allowed. However, generalizing the method used to generate each of the calculation based on the proportional area covered is both possible and practical. This is true if for any given ratio of input to output image, especially those that are common in the industry as standards, there will be least common denominator ratios that will result in the image transform being a repeating pattern of cells. Further reductions in complexity occur due to symmetry, as demonstrated above with the input and output arrays being coincident. When combined, the repeating three-color sample points 122 and symmetry results in a reduction of the number of sets of unique coefficients to a more manageable level.

For example, the commercial standard display color image format called "VGA" (which used to stand for Video Graphics Adapter but now it simply means 640×480) has 640 columns and 480 rows. This format needs to be re-sampled or scaled to be displayed onto a panel of the arrangement shown in FIG. 10, which has 400 red sub-pixels 34 and 400 green sub-pixels 36 across (for a total of 800 sub-pixels across) and 600 total sub-pixels 34 and 36 down. This results in an input pixel to output sub-pixel ratio of 4 to 5. The transfer equations for each red sub pixel 34 and each green sub-pixel 36 can be calculated from the fractional coverage of the input sample areas 120 of FIG. 22 by the sample output areas 52. This procedure is similar to the development of the transfer equations for FIG. 18, except the transfer equations seem to be different for every single output sample point 35. Fortunately if you proceed to calculate all these transfer equations a pattern emerges. The same five transfer equations repeat over and over across a row, and another pattern of five equations repeat down each column. The end result is only 5×5 or twenty-five unique sets of equations for this case with a pixel to sub-pixel ratio of 4:5. This reduces the unique calculations to twenty-five sets of coefficients. In these coefficients, other patterns of symmetries can be found which reduce the total number of coefficient sets down to only six unique sets. The same procedure will produce an identical set of coefficients for the arrangement 20 of FIG. 6.

Figure 32:
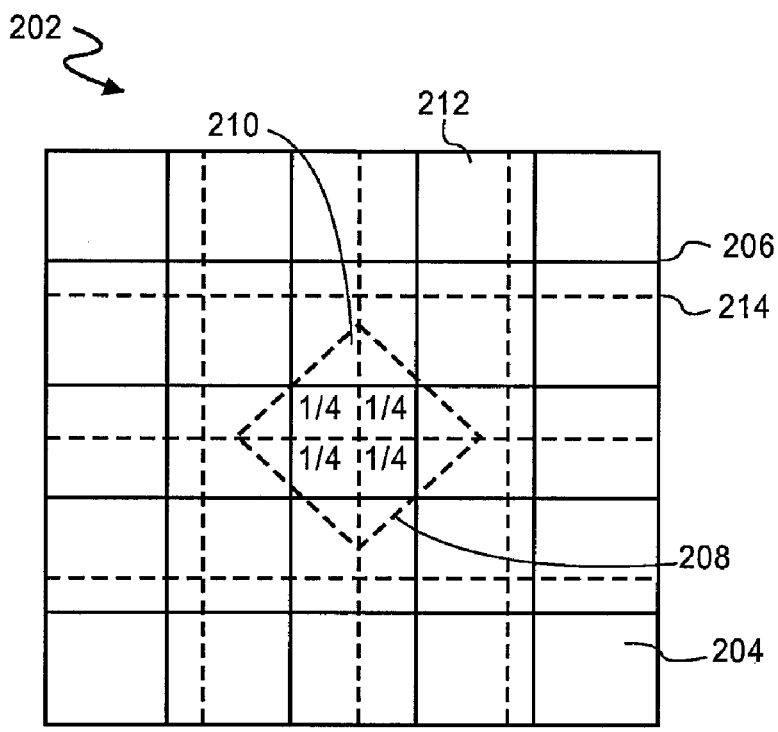
FIG. 32 illustrates a single repeat cell 202 of converting a 640×480 VGA format image to a PenTile matrix with 800×600 total red and green sub pixels.

The following is an example describing how the coefficients are calculated, using the geometric method described above. FIG. 32 illustrates a single 5×5 repeat cell 202 from the example above of converting a 640×480 VGA format image to a PenTile matrix with 800×600 total red and green sub pixels. Each of the square sub-pixels 204 bounded by solid lines 206 indicates the location of a red or green sub pixel that must have a set of coefficients calculated. This would require 25 sets of coefficients to be calculated, were it not for symmetry. FIG. 32 will be discussed in more detail later.

Figure 33:
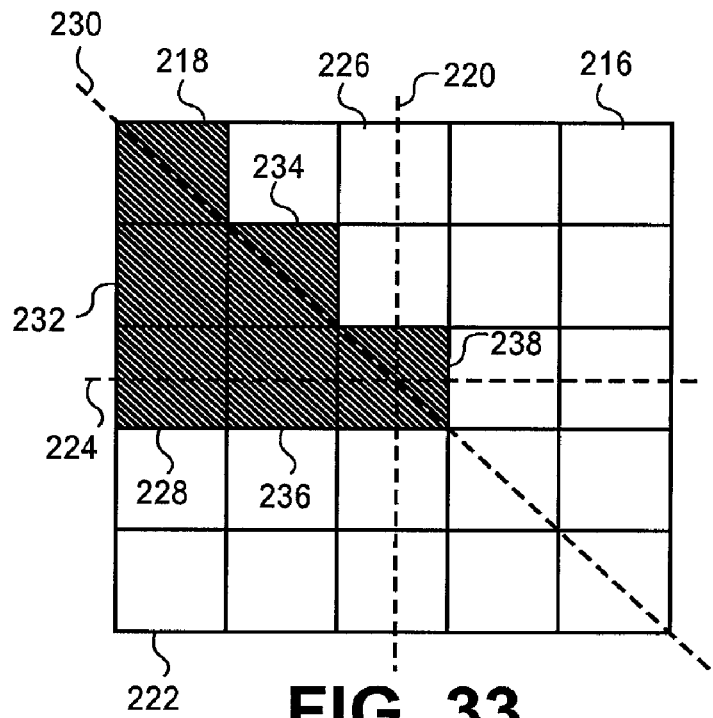
FIG. 33 illustrates the symmetry in the coefficients of a three-color pixel element in a case where the repeat cell size is odd.

FIG. 33 illustrates the symmetry in the coefficients. If the coefficients are written down in the common matrix form for filter kernels as used in the industry, the filter kernel for sub-pixel 216 would be a mirror image, flipped left-to-right of the kernel for sub-pixel 218. This is true for all the sub pixels on the right side of symmetry line 220, each having a filter kernel that is the mirror image of the filter kernel of an opposing sub-pixel. In addition, sub-pixel 222 has a filter kernel that is a mirror image, flipped top-to-bottom of the filter kernel for sub-pixel 218. This is also true of all the other filter kernels below symmetry line 224; each is the mirror image of an opposing sub-pixel filter. Finally, the filter kernel for sub-pixel 226 is a mirror image, flipped on a diagonal, of the filter for sub-pixel 228. This is true for all the sub-pixels on the upper right of symmetry line 230: their filters are diagonal mirror images of the filters of the diagonal opposing sub-pixel filter. Finally, the filter kernels on the diagonal are internally diagonally symmetrical, with identical coefficient values on diagonally opposite sides of symmetry line 230. An example of a complete set of filter kernels is provided further herein to demonstrate all these symmetries in the filter kernels. The only filters that need to be calculated are the shaded ones, sub-pixels 218, 228, 232, 234, 236, and 238. In this case, with a repeat cell size of 5, the minimum number of filters needed is only six. The remaining filters can be determined by flipping the 6 calculated filters on different axes. Whenever the size of a repeat cell is odd, the formula for determining the minimum number of filters is:

$$Nfilts = \frac{\frac{P+1}{2} \cdot \left(1 + \frac{P+1}{2}\right)}{2}$$

where P is the odd width and height of the repeat cell, and Nfilts is the minimum number of filters required.

Figure 34:
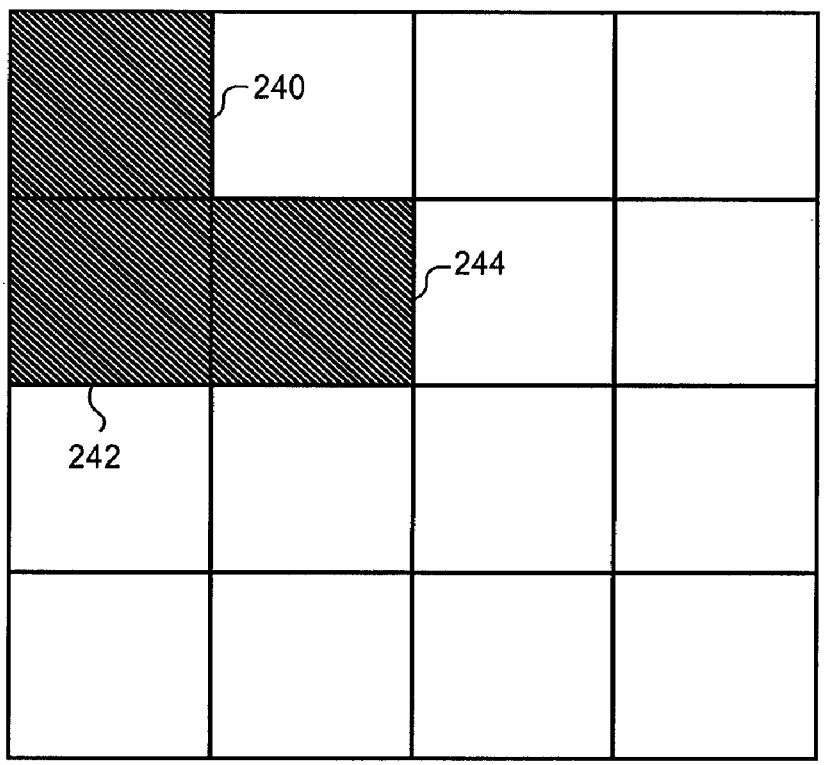
FIG. 34 illustrates an example of a case where the repeat cell size is even.

FIG. 34 illustrates an example of the case where the repeat cell size is even. The only filters that need to be calculated are the shaded ones, sub-pixels 240, 242, and 244. In this case with a repeat cell size of 4 only three filters must be calculated. Whenever the size of the repeat cell is even, the general formula for determining the minimum number of filters is:

$$Neven = \frac{\frac{P}{2} \cdot \left(1 + \frac{P}{2}\right)}{2}$$

where P is the even width and height of the repeat cell, and Neven is the minimum number of filters required.

Returning to FIG. 32, the rendering boundary 208 for the central sub-pixel encloses an area 210 that overlaps four of the original input pixel sample areas 212. Each of these overlapping areas is equal, and their coefficients must add up to one, so each of them is ¼ or 0.25. These are the coefficients for sub-pixel 238 in FIG. 33 and the 2.times.2 filter kernel for this case would be:

| 1/4 | 1/4 |
|---|---|
| 1/4 | 1/4 |

Figure 35:
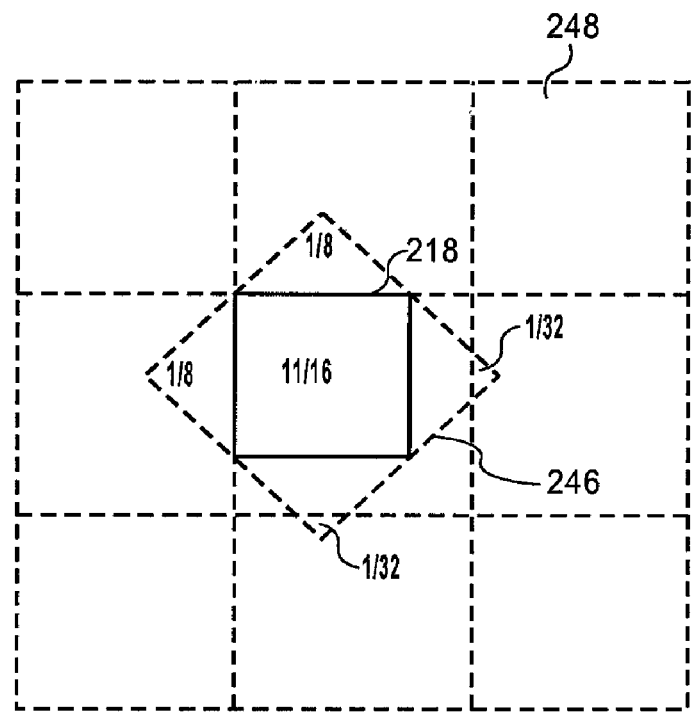
FIG. 35 illustrates sub-pixel 218 from FIG. 33 bounded by a rendering area 246 that overlaps six of the surrounding input pixel sample areas 248.

The coefficients for sub-pixel 218 in FIG. 33 are developed in FIG. 35. This sub-pixel 218 is bounded by a rendering area 246 that overlaps five of the surrounding input pixel sample areas 248. Although this sub-pixel is in the upper left corner of a repeat cell, it is assumed for the sake of calculation that there is always another repeat cell past the edge with additional sample areas 248 to overlap. These calculations are completed for the general case and the edges of the display will be handled with a different method as described above. Because rendering area 246 crosses three sample areas 248 horizontally and three vertically, a 3×3 filter kernel will be necessary to hold all the coefficients. The coefficients are calculated as described before: the area of each input sample area covered by rendering area 246 is measured and then divided by the total area of rendering area 246. Rendering area 246 does not overlap the upper left, upper right, lower left, or lower right sample areas 248 at all so their coefficients are zero. Rendering area 246 overlaps the upper center and middle left sample areas 248 by ⅛ of the total area of rendering area 246, so their coefficients are ⅛$^{th}$. Rendering area 246 overlaps the center sample area 248 by the greatest proportion, which is 11/16$^{ths}$. Finally rendering area 246 overlaps the middle right and bottom center sample areas 248 by the smallest amount of 1/32$^{nd}$. Putting these all in order results in the following coefficient filter kernel:

| 0 | 1/8 | 0 |
|---|---|---|
| 1/8 | 11/16 | 1/32 |
| 0 | 1/32 | 0 |

Figure 36:
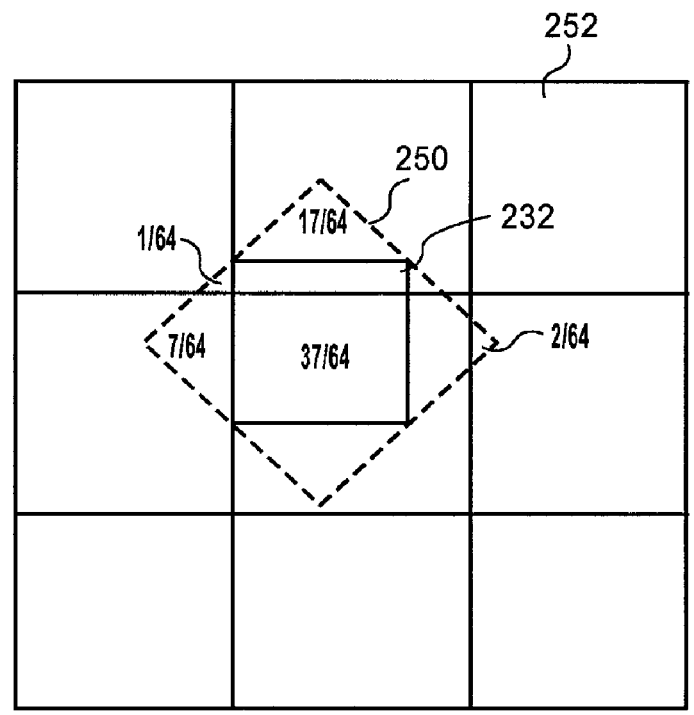
FIG. 36 illustrates sub-pixel 232 from FIG. 33 with its rendering area 250 overlapping five sample areas 252.

Sub-pixel 232 from FIG. 33 is illustrated in FIG. 36 with its rendering area 250 overlapping five sample areas 252. As before, the portions of the area of rendering area 250 that overlap each of the sample areas 252 are calculated and divided by the area of rendering area 250. In this case, only a 3×2 filter kernel would be necessary to hold all the coefficients, but for consistency a 3×3 will be used. The filter kernel for FIG. 36 would be:

| 1/64 | 17/64 | 0 |
|---|---|---|
| 7/64 | 37/64 | 2/64 |
| 0 | 0 | 0 |

Figure 37:
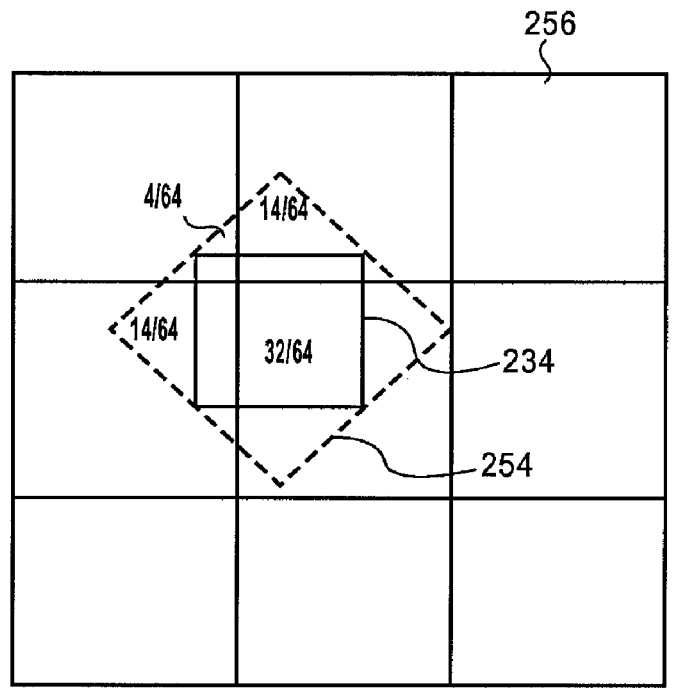
FIG. 37 illustrates sub-pixel 234 from FIG. 33 with its rendering area 254 overlapping sample areas 256.

Sub-pixel 234 from FIG. 33 is illustrated in FIG. 37 with its rendering area 254 overlapping sample areas 256. The coefficient calculation for this would result in the following kernel:

| 4/64 | 14/64 | 0 |
|---|---|---|
| 14/64 | 32/64 | 0 |
| 0 | 0 | 0 |

Figure 38:
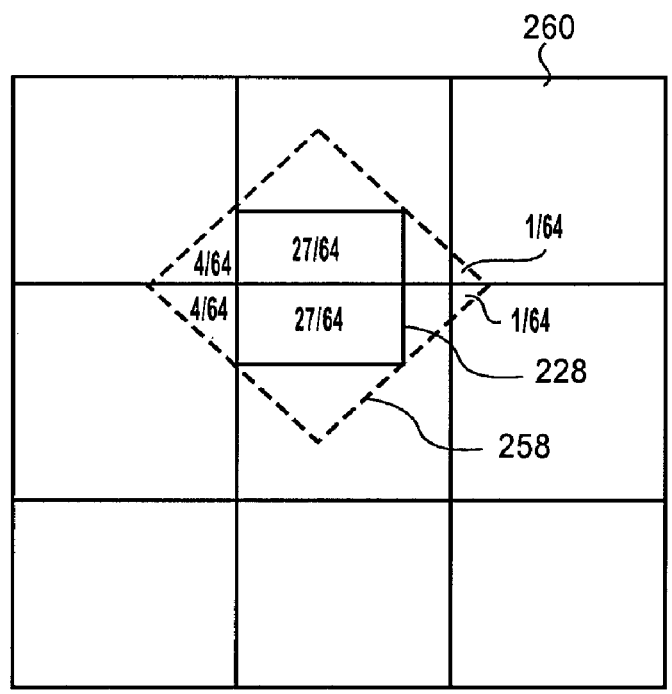
FIG. 38 illustrates sub-pixel 228 from FIG. 33 with its rendering area 258 overlapping sample areas 260.

Sub-pixel 228 from FIG. 33 is illustrated in FIG. 38 with its rendering area 258 overlapping sample areas 260. The coefficient calculations for this case would result in the following kernel:

| 4/64 | 27/64 | 1/64 |
|---|---|---|
| 4/64 | 27/64 | 1/64 |
| 0 | 0 | 0 |

Figure 39:
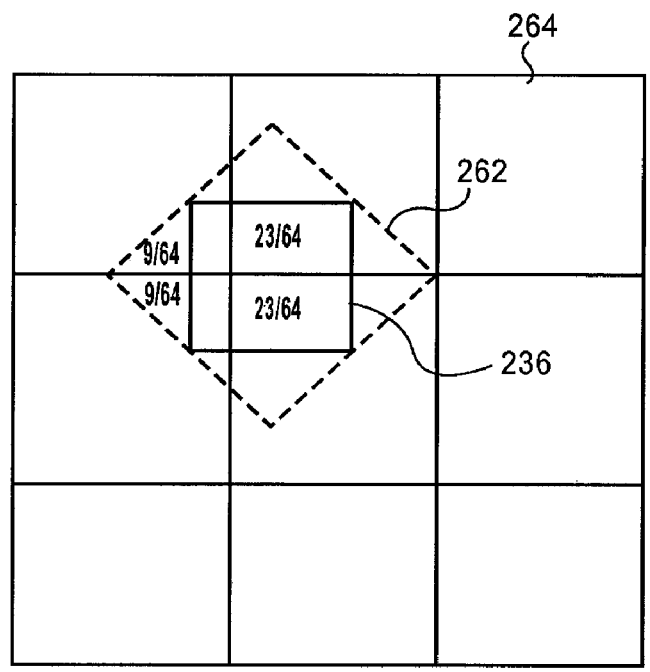
FIG. 39 illustrates sub-pixel 236 from FIG. 33 with its rendering area 262 overlapping sample areas 264.

Finally, sub-pixel 236 from FIG. 33 is illustrated in FIG. 39 with its rendering area 262 overlapping sample areas 264. The coefficient calculations for this case would result in the following kernel:

| 9/64 | 23/64 | 0 |
|---|---|---|
| 9/64 | 23/64 | 0 |
| 0 | 0 | 0 |

This concludes all the minimum number of calculations necessary for the example with a pixel to sub-pixel ratio of 4:5. All the rest of the 25 coefficient sets can be constructed by flipping the above six filter kernels on different axes, as described with FIG. 33.

For the purposes of scaling the filter kernels must always sum to one or they will effect the brightness of the output image. This is true of all six filter kernels above. However, if the kernels were actually used in this form the coefficients values would all be fractions and require floating point arithmetic. It is common in the industry to multiply all the coefficients by some value that converts them all to integers. Then integer arithmetic can be used to multiply input sample values by the filter kernel coefficients, as long as the total is divided by the same value later. Examining the filter kernels above, it appears that 64 would be a good number to multiply all the coefficients by. This would result in the following filter kernel for sub-pixel 218 from FIG. 35:

| 0 | 8 | 0 |
|---|---|---|
| 8 | 44 | 2 |
| 0 | 2 | 0 |

(divided by 64.)

All the other filter kernels in this case can be similarly modified to convert them to integers for ease of calculation. It is especially convenient when the divisor is a power of two, which it is in this case. A division by a power of two can be completed rapidly in software or hardware by shifting the result to the right. In this case, a shift to the right by 6 bits will divide by 64.

In contrast, a commercial standard display color image format called XGA (which used to stand for Xtended Graphics Adapter but now simply means 1024×768) has 1024 columns and 768 rows. This format can be scaled to display on an arrangement 38 of FIG. 10 that has 1600 by 1200 red and green emitters 34 and 36 and 800 by 600 blue emitters 32. The scaling or re-sampling ratio of this configuration is 16 to 25, which results in 625 unique sets of coefficients. Using symmetry in the coefficients reduces the number to a more reasonable 91 sets. But even this smaller number of filters would be tedious to do by hand, as described above. Instead a computer program (a machine readable medium) can automate this task using a machine (e.g., a computer) and produce the sets of coefficients quickly. In practice, this program is used once to generate a table of filter kernels for any given ratio. Then that table is used by scaling/rendering software or burned into the ROM (Read Only Memory) of hardware that implements scaling and sub-pixel rendering.

The first step that the filter generating program must complete is calculating the scaling ratio and the size of the repeat cell. This is completed by dividing the number of input pixels and the number of output sub-pixels by their GCD (Greatest Common Denominator). This can also be accomplished in a small doubly nested loop. The outer loop tests the two numbers against a series of prime numbers. This loop should run until it has tested primes as high as the square root of the smaller of the two pixel counts. In practice with typical screen sizes it should never be necessary to test against primes larger than 41. Conversely, since this algorithm is intended for generating filter kernels "offline" ahead of time, the outer loop could simply run for all numbers from 2 to some ridiculously large number, primes and non-primes. This may be wasteful of CPU time, because it would do more tests than necessary, but the code would only be run once for a particular combination of input and output screen sizes.

An inner loop tests the two pixel counts against the current prime. If both counts are evenly divisible by the prime, then they are both divided by that prime and the inner loop continues until it is not possible to divide one of the two numbers by that prime again. When the outer loop terminates, the remaining small numbers will have effectively been divided by the GCD. The two numbers will be the "scale ratio" of the two pixel counts.

Some Typical Values

| | |
|---|---|
| 320:640 becomes | 1:2 |
| 384:480 becomes | 4:5 |
| 512:640 becomes | 4:5 |
| 480:768 becomes | 5:8 |
| 640:1024 becomes | 5:8 |

These ratios will be referred to as the pixel to sub-pixel or P:S ratio, where P is the input pixel numerator and S is the sub-pixel denominator of the ratio. The number of filter kernels needed across or down a repeat cell is S in these ratios. The total number of kernels needed is the product of the horizontal and vertical S values. In almost all the common VGA derived screen sizes the horizontal and vertical repeat pattern sizes will turn out to be identical and the number of filters required will be $S^2$. From the table above, a 640×480 image being scaled to a 1024×768 PenTile matrix has a P:S ratio of 5:8 and would require 8×8 or 64 different filter kernels (before taking symmetries into account).

In a theoretical environment, fractional values that add up to one are used in a filter kernel. In practice, as mentioned above, filter kernels are often calculated as integer values with a divisor that is applied afterwards to normalize the total back to one. It is important to start by calculating the weight values as accurately as possible, so the rendering areas can be calculated in a co-ordinate system large enough to assure all the calculations are integers. Experience has shown that the correct co-ordinate system to use in image scaling situations is one where the size of an input pixel is equal to the number of output sub pixels across a repeat cell, which makes the size of an output pixel equal the number of input pixels across a repeat cell. This is counter-intuitive and seems backwards. For example, in the case of scaling 512 input pixels to 640 with a 4:5 P:S ratio, you can plot the input pixels on graph paper as 5×5 squares and the output pixels on top of them as 4×4 squares. This is the smallest scale at which both pixels can be drawn, while keeping all the numbers integers. In this co-ordinate system, the area of the diamond shaped rendering areas centered over the output sub-pixels is always equal to twice the area of an output pixel or $2*P^2$. This is the minimum integer value that can be used as the denominator of filter weight values.

Unfortunately, as the diamond falls across several input pixels, it can be chopped into triangular shapes. The area of a triangle is the width times the height divided by two and this can result in non-integer values again. Calculating twice the area solves this problem, so the program calculates areas multiplied by two. This makes the minimum useful integer filter denominator equal to $4*P^2$.

Next it is necessary to decide how large each filter kernel must be. In the example completed by hand above, some of the filter kernels were 2×2, some were 3×2 and others were 3×3. The relative sizes of the input and output pixels, and how the diamond shaped rendering areas can cross each other, determine the maximum filter kernel size needed. When scaling images from sources that have more than two output sub-pixels across for each input pixel (e.g., 100:201 or 1:3), a 2×2 filter kernel becomes possible. This would require less hardware to implement. Further the image quality is better than prior art scaling since the resulting image captures the "square-ness" of the implied target pixel, retaining spatial frequencies as best as is possible, represented by the sharp edges of many flat panel displays. These spatial frequencies are used by font and icon designers to improve the apparent resolution, cheating the Nyquist limit well known in the art. Prior art scaling algorithms either limited the scaled spatial frequencies to the Nyquist limit using interpolation, or kept the sharpness, but created objectionable phase error.

When scaling down there are more input pixels than output sub-pixels. At any scale factor greater than 1:1 (e.g., 101:100 or 2:1) the filter size becomes 4×4 or larger. It will be difficult to convince hardware manufacturers to add more line buffers to implement this. However, staying within the range of 1:1 and 1:2 has the advantage that the kernel size stays at a constant 3×3 filter. Fortunately, most of the cases that will have to be implemented in hardware fall within this range and it is reasonable to write the program to simply generate 3×3 kernels. In some special cases, like the example done above by hand, some of the filter kernels will be smaller than 3×3. In other special cases, even though it is theoretically possible for the filter to become 3×3, it turns out that every filter is only 2×2. However, it is easier to calculate the kernels for the general case and easier to implement hardware with a fixed kernel size.

Finally, calculating the kernel filter weight values is now merely a task of calculating the areas (times two) of the 3×3 input pixels that intersect the output diamond shapes at each unique (non symmetrical) location in the repeat cell. This is a very straightforward "rendering" task that is well known in the industry. For each filter kernel, 3×3 or nine coefficients are calculated. To calculate each of the coefficients, a vector description of the diamond shaped rendering area is generated. This shape is clipped against the input pixel area edges. Polygon clipping algorithms that are well known in the industry are used. Finally, the area (times two) of the clipped polygon is calculated. The resulting area is the coefficient for the corresponding cell of the filter kernel. A sample output from this program is shown below:

Source pixel resolution 1024
  Destination sub-pixel resolution 1280
  Scaling ratio is 4:5
  Filter numbers are all divided by 256
  Minimum filters needed (with symmetries): 6
  Number of filters generated here (no symmetry): 25

| 0 | 32 | 0 | 4 | 28 | 0 | 16 | 16 | 0 | 28 | 4 | 0 | 0 | 32 | 0 |
|---|---|---|---|---|---|---|---|---|---|---|---|---|---|---|
| 32 | 176 | 8 | 68 | 148 | 0 | 108 | 108 | 0 | 148 | 68 | 0 | 8 | 176 | 32 |
| 0 | 8 | 0 | 0 | 8 | 0 | 4 | 4 | 0 | 8 | 0 | 0 | 0 | 8 | 0 |
| 4 | 68 | 0 | 16 | 56 | 0 | 36 | 36 | 0 | 56 | 16 | 0 | 0 | 68 | 4 |
| 28 | 148 | 8 | 56 | 128 | 0 | 92 | 92 | 0 | 128 | 56 | 0 | 8 | 148 | 28 |
| 0 | 0 | 0 | 0 | 0 | 0 | 0 | 0 | 0 | 0 | 0 | 0 | 0 | 0 | 0 |
| 16 | 108 | 4 | 36 | 92 | 0 | 64 | 64 | 0 | 92 | 36 | 0 | 4 | 108 | 16 |
| 16 | 108 | 4 | 36 | 92 | 0 | 64 | 64 | 0 | 92 | 36 | 0 | 4 | 108 | 16 |
| 0 | 0 | 0 | 0 | 0 | 0 | 0 | 0 | 0 | 0 | 0 | 0 | 0 | 0 | 0 |
| 28 | 148 | 8 | 56 | 128 | 0 | 92 | 92 | 0 | 128 | 56 | 0 | 8 | 148 | 28 |
| 4 | 68 | 0 | 16 | 56 | 0 | 36 | 36 | 0 | 56 | 16 | 0 | 0 | 68 | 4 |
| 0 | 0 | 0 | 0 | 0 | 0 | 0 | 0 | 0 | 0 | 0 | 0 | 0 | 0 | 0 |
| 0 | 8 | 0 | 0 | 8 | 0 | 4 | 4 | 0 | 8 | 0 | 0 | 0 | 8 | 0 |
| 32 | 176 | 8 | 68 | 148 | 0 | 108 | 108 | 0 | 148 | 68 | 0 | 8 | 176 | 32 |
| 0 | 32 | 0 | 4 | 28 | 0 | 16 | 16 | 0 | 28 | 4 | 0 | 0 | 32 | 0 |

Figure 23:
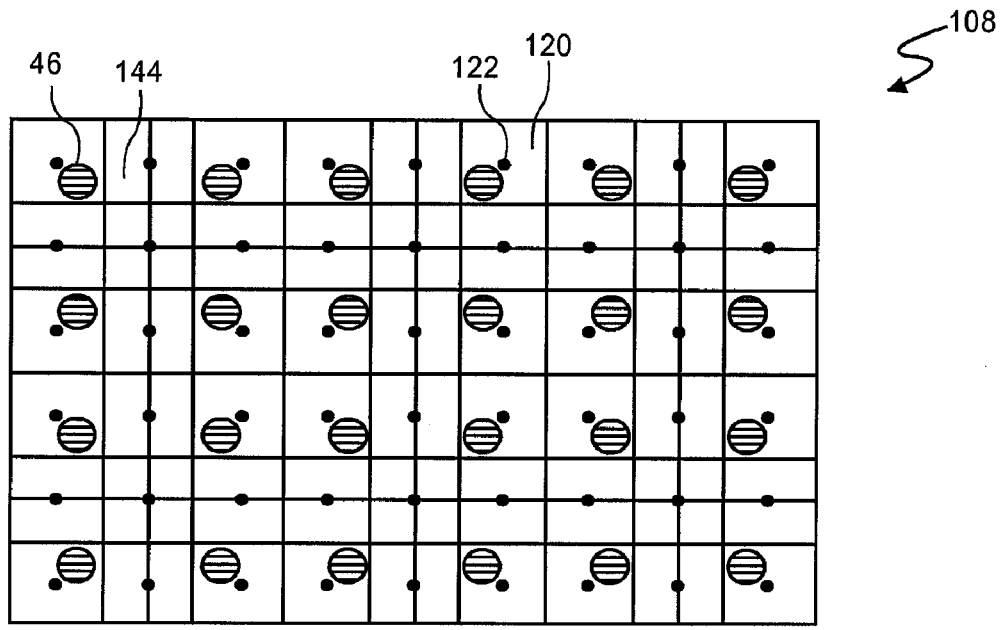
FIG. 23 illustrates the array of sample points and their effective sample areas of prior art FIG. 21 overlaid on the blue color plane sampling areas of FIG. 12, in which the sample points of prior art FIG. 21 are not on the same spatial resolution grid nor co-incident with the red and green "checker board" array of FIG. 11.

In the above sample output, all 25 of the filter kernels necessary for this case are calculated, without taking symmetry into account. This allows for the examination of the coefficients and to verify visually that there is a horizontal, vertical, and diagonal symmetry in the filter kernels in these repeat cells. As before, edges and corners of the image may be treated uniquely or may be approximated by filling in the "missing" input sample with the value of either the average of the others, the most significant single contributor, or black. Each set of coefficients is used in a filter kernel, as is well known in the art. Keeping track of the positions and symmetry operators is a task for the software or hardware designer using modulo math techniques, which are also well known in the art. The task of generating the coefficients is a simple matter of calculating the proportional overlap areas of the input sample area 120 to output sample area 52 for each sample corresponding output sample point 35, using means known in the art FIG. 23 illustrates an array 108 of sample points 122 and their effective sample areas 120 of FIG. 21 overlaid on the blue color plane sampling areas 44 of FIG. 12, in which the sample points 122 of FIG. 21 are not on the same spatial resolution grid, nor co-incident with the red and green "checker board" array of FIG. 11. The method of generating the transform equation calculations proceed as described earlier. First, the size of the repeating array of three-color pixel elements is determined, next the minimum number of unique coefficients is determined, and then the values of those coefficients by the proportional overlap of input sample areas 120 to output sample areas 44 for each corresponding output sample point 46 is determined. Each of these values are applied to the transform equation. The array of repeating three-color pixel elements and resulting number of coefficients is the same number as that determined for the red and green planes.

Figure 24:
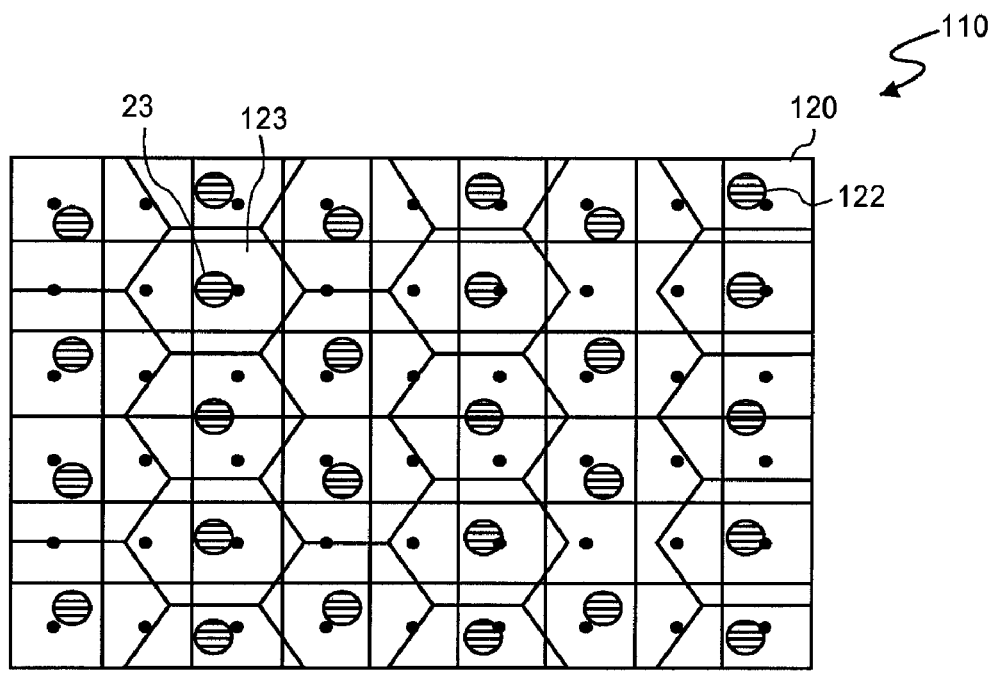
FIG. 24 illustrates the array of sample points and their effective sample areas of prior art FIG. 21 overlaid on the blue color plane sampling areas of FIG. 8, in which the sample points of prior art FIG. 21 are not on the same spatial resolution grid nor co-incident with the red and green "checker board" array of FIG. 7.

FIG. 24 illustrates the array 110 of sample points and their effective sample areas of FIG. 21 overlaid on the blue color plane sampling areas 123 of FIG. 8, in which the sample points 122 of FIG. 21 are not on the same spatial resolution grid nor co-incident with the red (red reconstruction points 35) and green (green reconstruction points 37) "checker board" array of FIG. 11. The method of generating the transform equation calculations proceeds as described above. First, the size of the repeating array of three-color pixel elements is determined. Next, the minimum number of unique coefficients is determined, and then the values of those coefficients by the proportional overlap of input sample areas 120 to output sample areas 123 for each corresponding output sample point 23 is determined. Each of these values are applied to the transform equation.

The preceding has examined the RGB format for CRT. A conventional RGB flat panel display arrangement 10 has red 4, green 6, and blue 2 emitters arranged in a three-color pixel element 8, as in prior art FIG. 1. To project an image formatted according to this arrangement onto the three-color pixel element illustrated in FIG. 6 or in FIG. 10, the reconstruction points must be determined. The placement of the red, green, and blue reconstruction points is illustrated in the arrangement 12 presented in prior art FIG. 2. The red, green, and blue reconstruction points are not coincident with each other; there is a horizontal displacement. According to prior art disclosed by Benzschawel, et al. in U.S. Pat. No. 5,341,153, and later by Hill, et al. in U.S. Pat. No. 6,188,385, these locations are used as sample points 3, 5, and 7 with sample areas, as shown in prior art FIG. 3 for the red color plane 14, in prior art FIG. 4 for the blue color plane 16, and prior art FIG. 5 for the green color plane 18.

Figure 25:
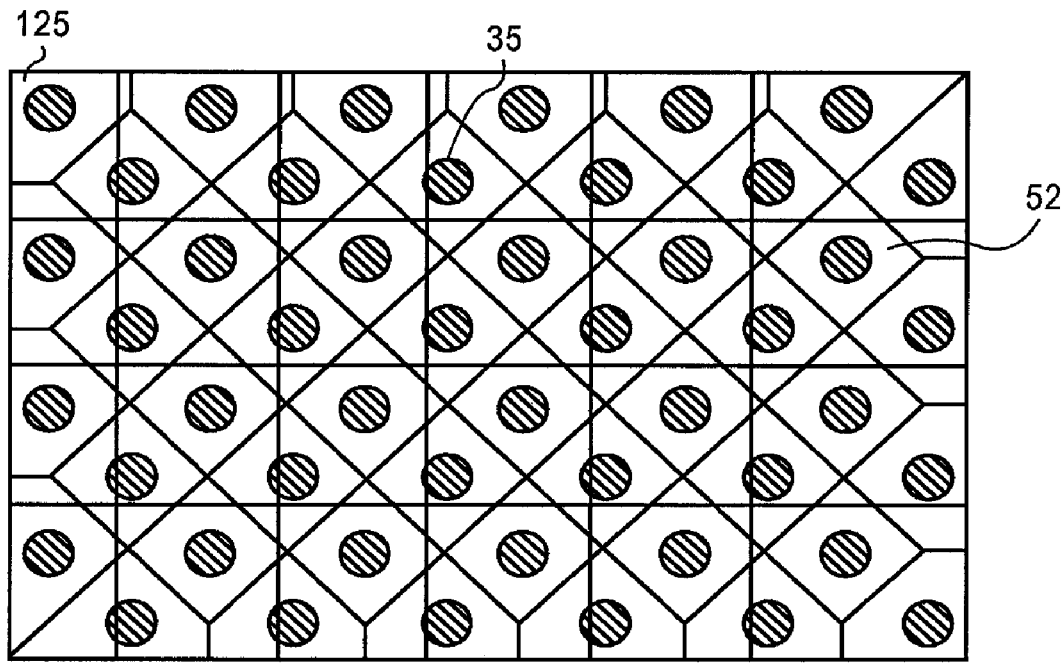
FIG. 25 illustrates the effective sample area of the red color plane of FIG. 3 overlaid on the red color plane sampling areas of FIG. 13.
Figure 26:
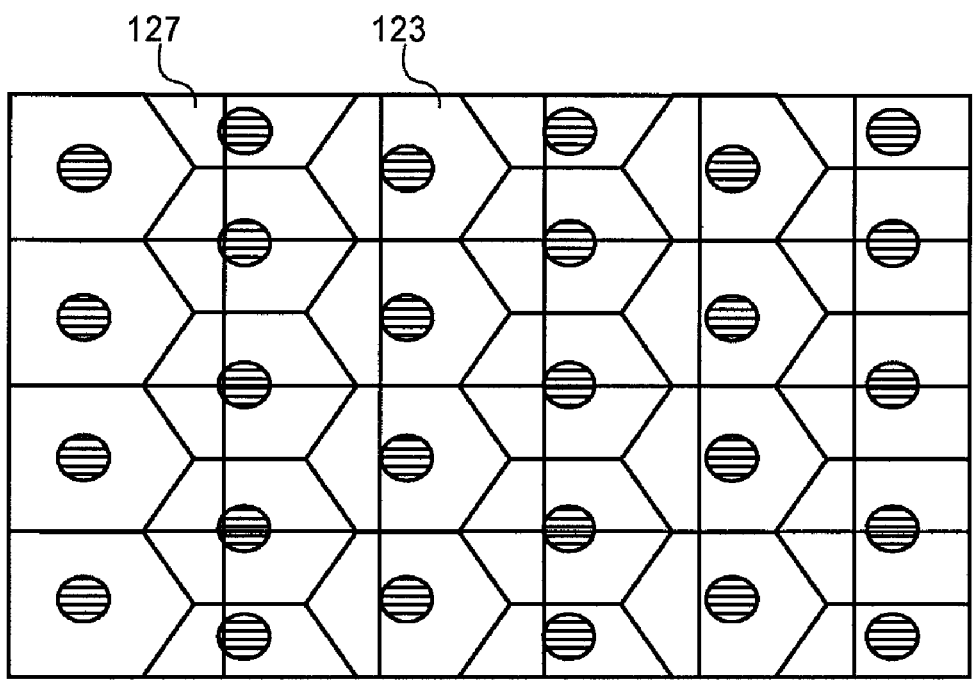
FIG. 26 illustrates the effective sample areas of the blue color plane of FIG. 5 overlaid on the blue color plane sampling areas of FIG. 8

A transform equation calculation can be generated from the prior art arrangements presented in FIGS. 3, 4, and 5 from the methods disclosed herein. The methods that have been outlined above can be utilized by calculating the coefficients for the transform equations, or filter kernels, for each output sample point of the chosen prior art arrangement. FIG. 25 illustrates the effective sample area 125 of the red color plane of FIG. 3 overlaid on the red color plane sampling areas 52 of FIG. 13, where the arrangement of red emitters 35 in FIG. 25 has the same pixel level (repeat unit) resolution as the arrangement in FIG. 6 and FIG. 10. The method of generating the transform equation calculations proceeds as described above. First, the size of the repeating array of three-color pixel elements is determined. The minimum number of unique coefficients are then determined by noting the symmetry (in this case: 2). Then, then the values of those coefficients, by the proportional overlap of input sample areas 125 to output sample areas 52 for each corresponding output sample point 35 is determined. Each of these values are applied to the transform equation. The calculation for the resampling of the green color plane, as illustrated in FIG. 4, proceeds in a similar manner, but the output sample array is rotated by 180° and the green input sample areas 127 are offset. FIG. 26 illustrates the effective sample areas 127 of the blue color plane of prior art FIG. 4 overlaid on the blue color plane sampling areas 123 of FIG. 8.

Figure 40:
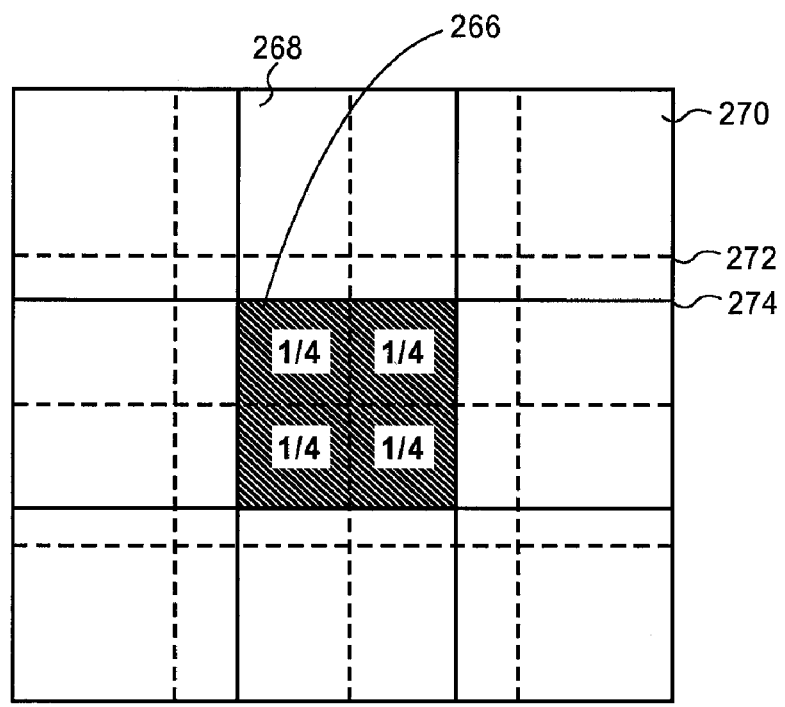
FIG. 40 illustrates the square sampling areas used for generating blue filter kernels.

FIG. 40 illustrates an example for blue that corresponds to the red and green example in FIG. 32. Sample area 266 in FIG. 40 is a square area instead of a diamond area as shown in the red and green example of FIG. 32. The number of original input pixel boundaries 272 shown in dashed lines is the same, but there are fewer blue output pixel boundaries 274. The coefficients are calculated as described before; the area of each input sample area 268 (bounded by dashed lines) that is covered by sample area 266 is measured and then divided by the total area of sample area 266. In this example, sample area 266 equally overlaps four of the original input pixel areas 268, resulting in a 2×2 filter kernel with four coefficients of ¼. The eight other blue output pixel areas 270 (bounded by solid lines) and their geometrical intersections with original input pixel areas 268 can be seen in FIG. 40. The symmetrical relationships of the resulting filters can be observed in the symmetrical arrangements of original pixel boundaries 274 in each output pixel area 270

In more complicated cases, a computer program is used to generate blue filter kernels. This program turns out to be very similar to the program for generating red and green filter kernels. The blue sub-pixel sample points 33 in FIG. 11 are twice as far apart as the red and green sample points 35, 37, suggesting that the blue rendering areas will be twice as wide. However, the rendering areas for red and green are diamond shaped and are thus twice as wide as the spacing between the sample points. This makes the rendering areas of red and green and blue the same width and height which results in several convenient numbers; the size of the filter kernels for blue will be identical to the ones for red and green. Also the repeat cell size for blue will generally be identical to the repeat cell size for red and green. Because the blue sub-pixel sample points 33 are spaced twice as far apart, the P:S (pixel to sub-pixel) ratio is doubled. For example, a ratio of 2:3 for red becomes 4:3 for blue. However, it is the S number in this ratio that determines the repeat cell size and that is not changed by doubling. However, if the denominator happens to be divisible by two, there is an additional optimization that can be done. In that case, the two numbers for blue can be divided by an additional power of two. For example, if the red and green P:S ratio is 3:4, then the blue ratio would be 6:4 which can be simplified to 3:2. This means that in these (even) cases the blue repeat cell size can be cut in half and the total number of filter kernels required will be one quarter that of red and green. Conversely, for simplicity of algorithms or hardware designs, it is possible to leave the blue repeat cell size identical to that of red and green. The resulting set of filter kernels will have duplicates (quadruplicates, actually) but will work identically to the red and green set of filter kernels.

Therefore, the only modifications necessary to take the red and green filter kernel program and make it generate blue filter kernels was to double the numerator of the P:S ratio and change the rendering area to a square instead of a diamond.

Now consider the arrangement 20 of FIG. 6 and the blue sample areas 124 of FIG. 9. This is similar to the previous example in that the blue sample areas 124 are squares. However, because every other column of them are staggered half of their height up or down, the calculations are complicated. At first glance it seems that the repeat cell size will be doubled horizontally. However the following procedure has been discovered to produce the correct filter kernels:

1) Generate a repeat cell set of filter kernels as if the blue sample points are not staggered, as described above. Label the columns and rows of the table of filters for the repeat cell with numbers starting with zero and ending at the repeat cell size minus one.

2) On the even columns in the output image, the filters in the repeat cell are correct as is. The modulo in the repeat cell size of the output Y co-ordinate selects which row of the filter kernel set to use, the modulo in the repeat cell size of the X co-ordinate selects a column and tells which filter in the Y selected row to use.

3) On the odd output columns, subtract one from the Y co-ordinate before taking the modulo of it (in the repeat cell size). The X co-ordinate is treated the same as the even columns. This will pick a filter kernel that is correct for the staggered case of FIG. 9.

In some cases, it is possible to perform the modulo calculations in advance and pre-stagger the table of filter kernels. Unfortunately this only works in the case of a repeat cell with an even number of columns. If the repeat cell has an odd number of columns, the modulo arithmetic chooses the even columns half the time and the odd ones the other half of the time. Therefore, the calculation of which column to stagger must be made at the time that the table is used, not beforehand.

Finally, consider the arrangement 20 of FIG. 6 and the blue sampling areas 123 of FIG. 8. This is similar to the previous case with the additional complication of hexagonal sample areas. The first step concerning these hexagons is how to draw them correctly or generate vector lists of them in a computer program. To be most accurate, these hexagons must be minimum area hexagons, however they will not be regular hexagons. A geometrical proof can easily be completed to illustrate in FIG. 41 that these hexagon sampling areas 123 of FIG. 8 are ⅛ wider on each side than the square sampling areas 276. Also, the top and bottom edge of the hexagon sampling areas 123 are ⅛ narrower on each end than the top and bottom edge of the square sampling areas 276. Finally, note that the hexagon sampling areas 123 are the same height as the square sampling areas 276.

Filter kernels for these hexagonal sampling areas 123 can be generated in the same geometrical way as was described above, with diamonds for red and green or squares for blue. The rendering areas are simply hexagons and the area of overlap of these hexagons with the surrounding input pixels is measured. Unfortunately, when using the slightly wider hexagonal sampling areas 123, the size of the filter kernels sometimes exceeds a 3.times.3 filter, even when staying between the scaling ratios of 1:1 and 1:2. Analysis shows that if the scaling ratio is between 1:1 and 4:5 the kernel size will be 4×3. Between scaling ratios of 4:5 and 1:2, the filter kernel size will remain 3×3. (Note that because the hexagonal sampling areas 123 are the same height as the square sampling areas 276 the vertical size of the filter kernels remains the same).

Designing hardware for a wider filter kernel is not as difficult as it is to build hardware to process taller filter kernels, so it is not unreasonable to make 4×3 filters a requirement for hardware based sub-pixel rendering/scaling systems. However, another solution is possible. When the scaling ratio is between 1:1 and 4:5 the square sampling areas 124 of FIG. 9 are used, which results in 3×3 filters. When the scaling ratio is between 4:5 and 1:2, the more accurate hexagonal sampling areas 123 of FIG. 8 are used and 3×3 filters are also required. In this way, the hardware remains simpler and less expensive to build. The hardware only needs to be built for one size of filter kernel and the algorithm used to build those filters is the only thing that changes.

Like the square sampling areas of FIG. 9, the hexagonal sampling areas of FIG. 8 are staggered in every other column. Analysis has shown that the same method of choosing the filter kernels described above for FIG. 9 will work for the hexagonal sampling areas of FIG. 8. Basically this means that the coefficients of the filter kernels can be calculated as if the hexagons are not staggered, even though they always are.

This makes the calculations easier and prevents the table of filter kernels from becoming twice as big.

Figure 41:
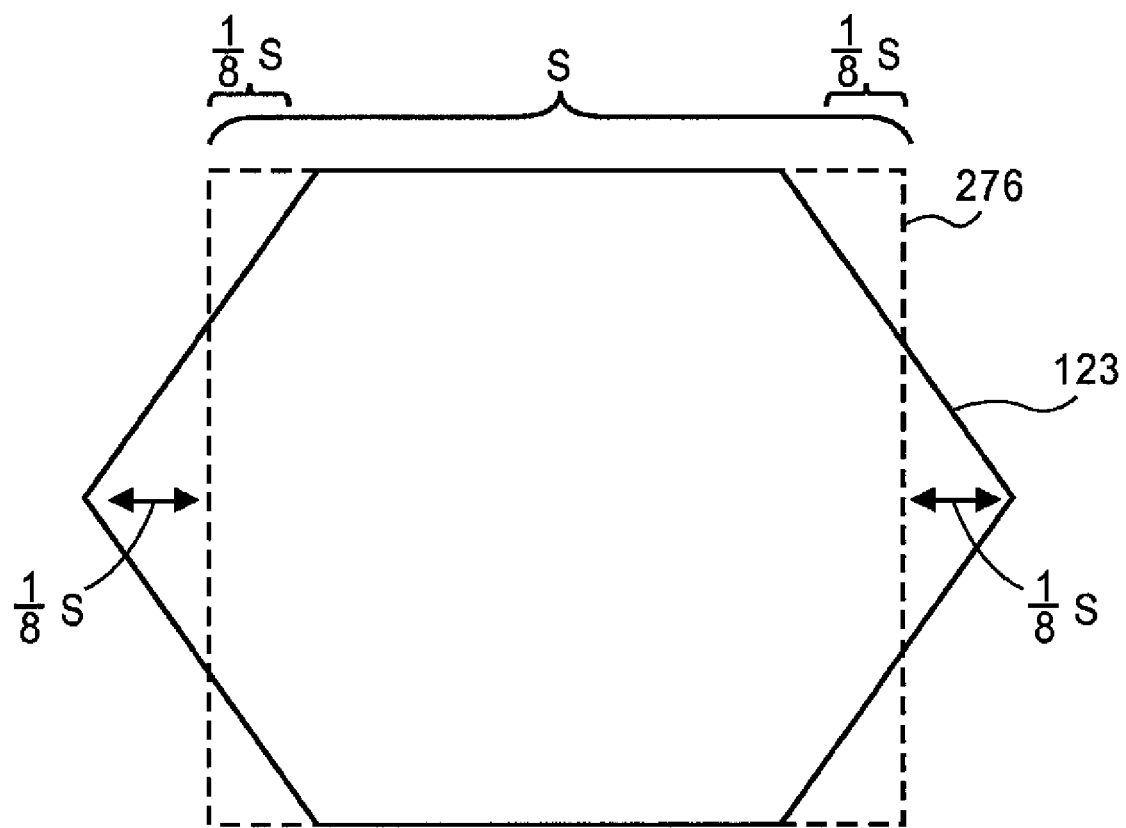
FIG. 41 illustrates the hexagonal sampling areas 123 of FIG. 8 in relationship to the square sampling areas 276.

In the case of the diamond shaped rendering areas of FIGS. 32 through 39, the areas were calculated in a co-ordinate system designed to make all areas integers for ease of calculation. This occasionally resulted in large total areas and filter kernels that had to be divided by large numbers while in use. Sometimes this resulted in filter kernels that were not powers of two, which made the hardware design more difficult. In the case of FIG. 41, the extra width of the hexagonal rendering areas 123 will make it necessary to multiply the coefficients of the filter kernels by even larger numbers to make them all integers. In all of these cases, it would be better to find a way to limit the size of the divisor of the filter kernel coefficients. To make the hardware easier to design, it would be advantageous to be able to pick the divisor to be a power of two. For example if all the filter kernels were designed to be divided by 256, this division operation could be performed by an eight bit right shift operation. Choosing 256 also guarantees that all the filter kernel coefficients would be 8-bit values that would fit in standard "byte wide" read-only-memories (ROMs). Therefore, the following procedure is used to generate filter kernels with a desired divisor. Since the preferred divisor is 256, it will be utilized in the following procedure.

1) Calculate the areas for the filter coefficients using floating point arithmetic. Since this operation is done off-line beforehand, this does not increase the cost of the hardware that uses the resulting tables.

2) Divide each coefficient by the known total area of the rendering area, then multiply by 256. This will make the filter sum to 256 if all arithmetic is done in floating point, but more steps are necessary to build integer tables.

3) Do a binary search to find the round off point (between 0.0 and 1.0) that makes the filter total a sum of 256 when converted to integers A binary search is a common algorithm well known in the industry. If this search succeeds, you are done. A binary search can fail to converge and this can be detected by testing for the loop running an excessive number of times.

4) If the binary search fails, find a reasonably large coefficient in the filter kernel and add or subtract a small number to force the filter to sum to 256.

5) Check the filter for the special case of a single value of 256. This value will not fit in a table of 8-bit bytes where the largest possible number is 255. In this special case, set the single value to 255 (256−1) and add 1 to one of the surrounding coefficients to guarantee that the filter still sums to 256.

Figure 31:
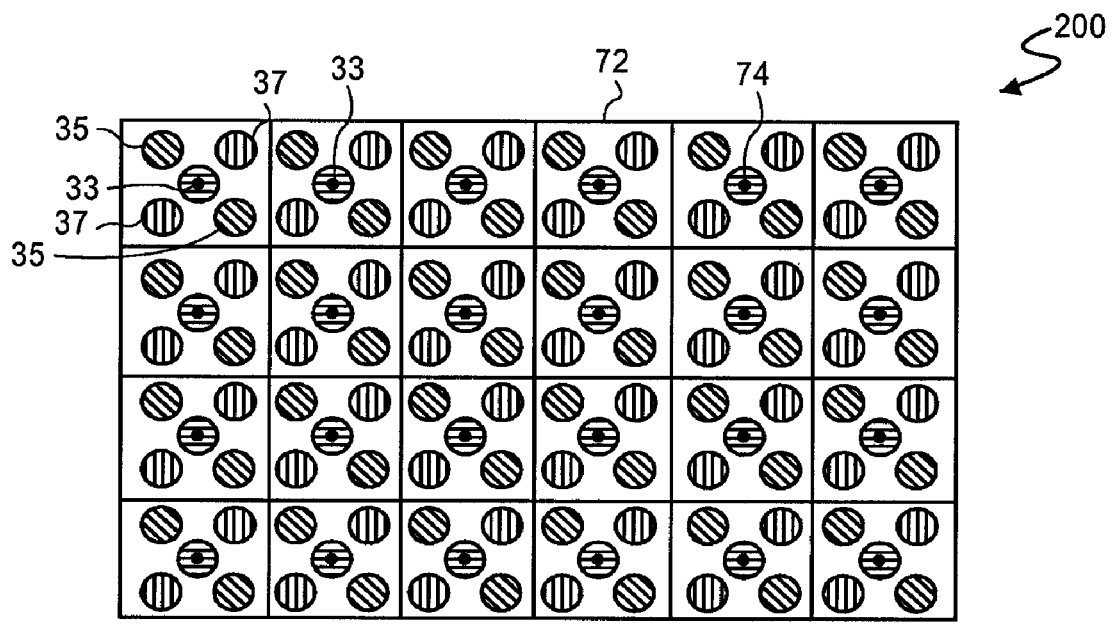
FIG. 31 illustrates the output sample arrangement 200 of FIG. 11 overlaid on top of the input sample arrangement 70 of FIG. 15 in the special case when the scaling ratio is one input pixel for each two, a red and a green, output sub pixels across.

FIG. 31 illustrates arrangement 40 of effective reconstruction points shown in FIG. 11 overlaid on top of array 70 of FIG. 15 in the special case when the scaling ratio is one input pixel for each two output sub pixels across. In this configuration 200, when the original data has not been sub-pixel rendered, the pairs of red emitters in the three color pixel element 39 (FIG. 10) would be treated as though combined, with a represented reconstruction point 33 in the center of the three color pixel element 39. Similarly, the two green emitters in the three-color pixel element 39 of FIG. 10 are treated as being a single reconstruction point 33 in the center of the three-color pixel element 39. The blue emitter is already in the center. Thus, the five emitters can be treated as though they reconstructed the RGB data format sample points, as though all three color planes were in the center. This may be considered the "Native Mode" of this arrangement of subpixels.

By resampling, via subpixel rendering, an already sub-pixel rendered image onto another sub-pixelated display with a different arrangement of subpixels, much of the improved image quality of the original is retained. According to one embodiment, it is desirable to generate a transform from this sub-pixel rendered image to the arrangements disclosed herein. Referring to FIGS. 1, 2, 3, 4, 5, 25, and 26 the methods that have been outlined above will serve, by calculating the coefficients for the transform filters for each reconstruction point 35, shown in FIG. 25, of the target display arrangement with respect to the rightward displaced red input sample 5 of FIG. 3. The blue emitter is treated as indicated above, by calculating the coefficients for the transform filters for each output sample point of the target display arrangement with respect to the displaced blue input sample 7 of FIG. 4.

In a case for the green color plane, illustrated in FIG. 5, where the input data has been sub-pixel rendered, no change need be made from the non-sub-pixel rendered case since the green data is still centered.

When applications that use subpixel rendered text are included along-side non-subpixel rendered graphics and photographs, it would be advantageous to detect the subpixel rendering and switch on the alternative spatial sampling filter described above, but switch back to the regular, for that scaling ratio, spatial sampling filter for non-subpixel rendered areas, also described in the above. To build such a detector we first must understand what subpixel rendered text looks like, what its detectable features are, and what sets it apart from non-subpixel rendered images. First, the pixels at the edges of black and white subpixel rendered fonts will not be locally color neutral: That is $R \neq G$. However, over several pixels the color will be neutral; That is $R \equiv G$. With non-subpixel rendered images or text, these two conditions together do not happen. Thus, we have our detector, test for local $R \neq G$ and $R \equiv G$ over several pixels.

Since subpixel rendering on an RGB stripe panel is one dimensional, along the horizontal axis, row by row, the test is one dimensional. Shown below is one such test:

If $R_x \neq G_x$ and $$\text{If } R_{x-2}+R_{x-1}R_x+R_{x+1}+R_{x+2} \cong G_{x-2}+G_{x-1}+G_x+G_{x+1}+G_{x+2}$$

Or $$\text{If } R_{x-1}+R_x+R_{x+1}+R_{x+2} \cong G_{x-2}+G_{x-1}+G_x+G_{x+1}$$

Then apply alternative spatial filter for sub-pixel rendering input,

Else apply regular spatial filter.

For the case where the text is colored there will be a relationship between the red and green components of the form $R_x \approx aG_x$, where "a" is a constant. For black and white text "a" has the value of one. The test can be expanded to detect colored as well as black and white text:

If $R_x \neq G_x$ and $$\text{If } R_{x-2}+R_{x-1}+R_x+R_{x+1}+R_{x+2} \cong a(G_{x-2}+G_{x-1}+G_x+G_{x+1}+G_{x+2})$$

Or $$\text{If } R_{x-1}+R_x+R_{x+1}+R_{x+2} \cong a(G_{x-2}+G_{x-1}+G_x+G_{x+1})$$

Then apply alternative spatial filter for subpixel rendering input

Else apply regular spatial filter.

$R_x$ and $G_x$ represent the values of the red and green components at the "x" pixel column coordinate.

There may be a threshold test to determine if $R \equiv G$ close enough. The value of which may be adjusted for best results. The length of terms, the span of the test may be adjusted for best results, but will generally follow the form above.

Figure 28:
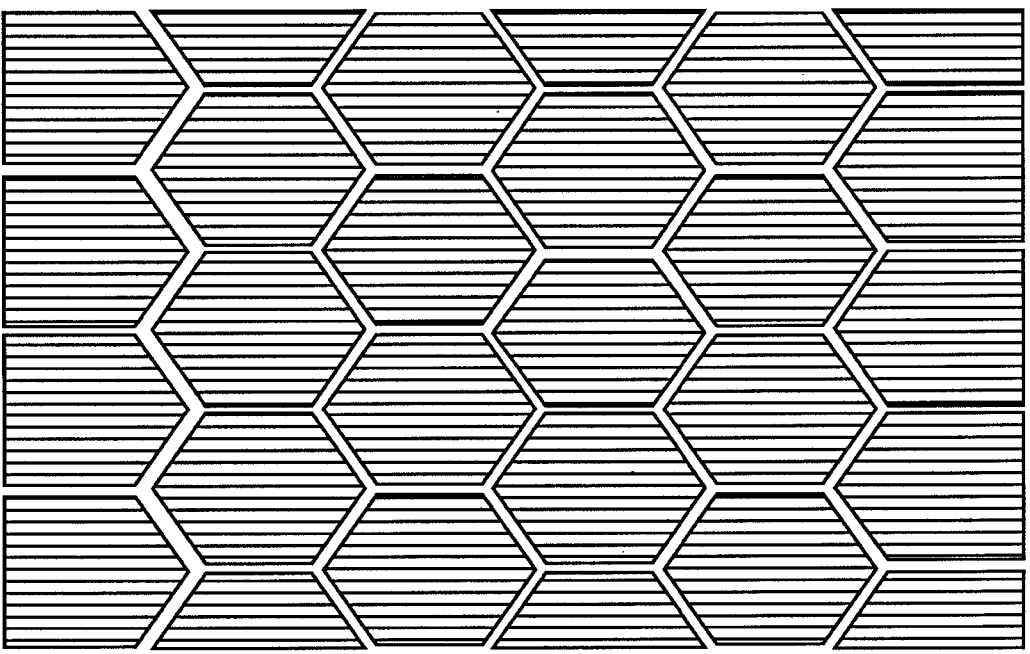
FIGS. 28, 29, and 30 illustrate the arrangements of the blue, green, and red emitters on each separate panel for the device of FIG. 27.
Figure 29:
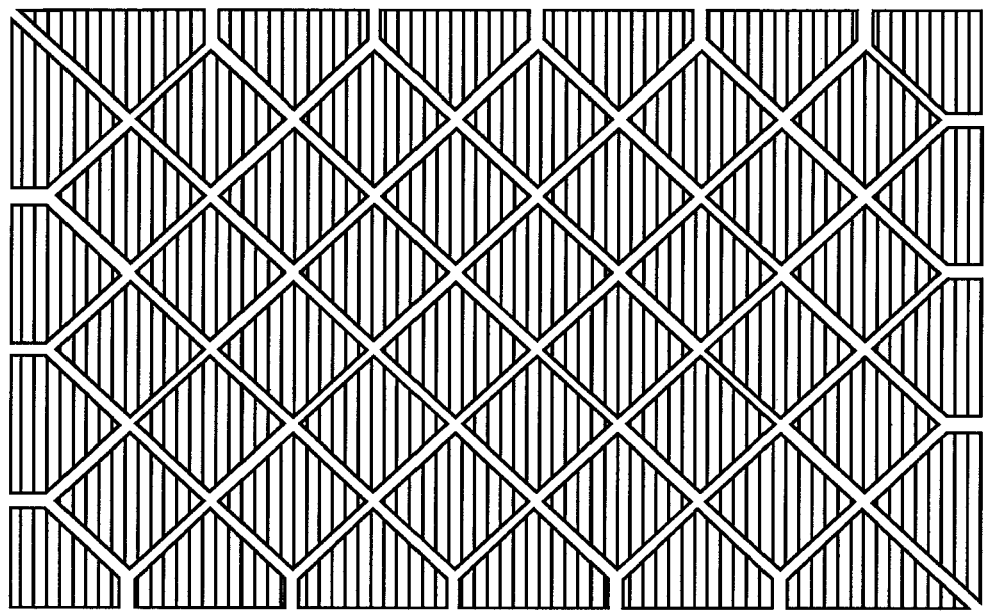
Figure 30:
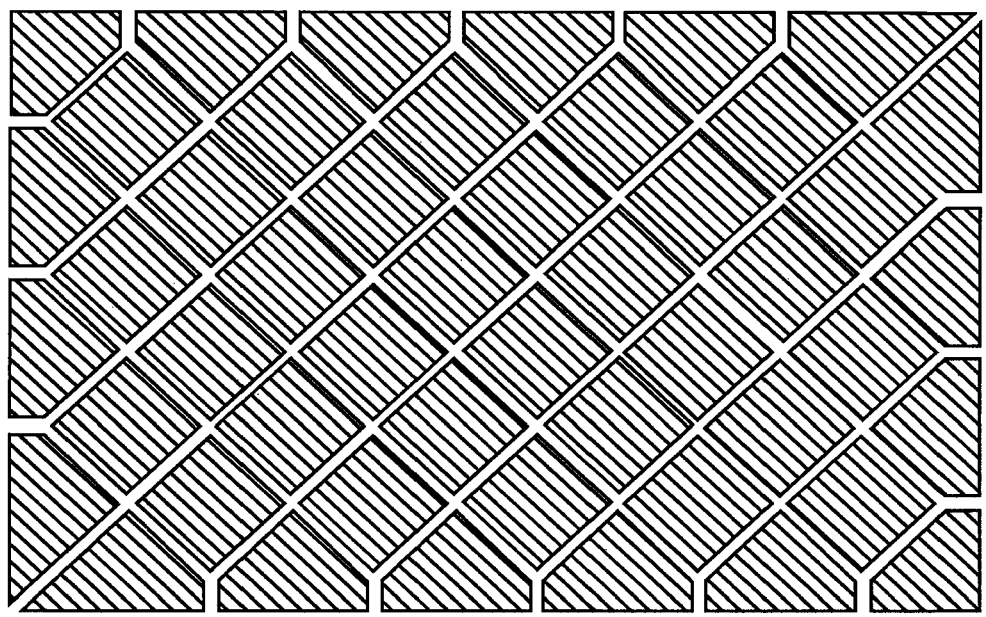

FIG. 27 illustrates an arrangement of three-color pixel elements in an array, in three planes, for a display device according to another embodiment. FIG. 28 illustrates the arrangement of the blue emitter pixel elements in an array for the device of FIG. 27. FIG. 29 illustrates the arrangement of the green emitter pixel elements in an array for the device of FIG. 27. FIG. 30 illustrates the arrangement of the red emitter pixel elements in an array for the device of FIG. 27. This arrangement and layout is useful for projector based displays that use three panels, one for each red, green, and blue primary, which combine the images of each to project on a screen. The emitter arrangements and shapes match closely to those of FIGS. 8, 13, and 14, which are the sample areas for the arrangement shown in FIG. 6. Thus, the graphics generation, transform equation calculations and data formats, disclosed herein, for the arrangement of FIG. 6 will also work for the three-panel arrangement of FIG. 27.

For scaling ratios above approximately 2:3 and higher, the subpixel rendered resampled data set for the PenTile™ matrix arrangements of subpixels is more efficient at representing the resulting image. If an image to be stored and/or transmitted is expected to be displayed onto a PenTile™ display and the scaling ratio is 2:3 or higher, it is advantageous to perform the resampling before storage and/or transmission to save on memory storage space and/or bandwidth. Such an image that has been resampled is called "prerendered". This prerendering thus serves as an effectively lossless compression algorithm.

The present disclosure enables skilled artisans to take most any stored color image that is rendered according to source subpixel samples taken according to a first spatial distribution of the source subpixels and to rerender the color image onto a color display having display subpixels spatially arranged according to a different second spatial distribution of the display subpixels.

While the present disclosure of invention has been described with reference to exemplary embodiments provided herein, it will be understood by those skilled in the art that various changes may be made and equivalents may be substituted for elements thereof without departing from the scope and spirit of the disclosure. In addition, many modifications may be made to adapt a particular situation or material to the present teachings without departing from the scope thereof. Therefore, it is intended that the disclosure not be limited to the particular embodiment disclosed herein.

What is claimed is:

1. A color display for receiving source image data representing color images and for displaying color images corresponding to the source image data, the display comprising:
   a plurality of substantially identical pixel units tiled across a face of the display
   where each pixel unit includes a first plurality of independently drivable first subpixel display elements that can emit light of a first wavelength,
   where each pixel unit includes a second plurality of independently drivable second subpixel display elements that can emit light of a second wavelength,
   where each pixel unit includes an independently drivable third subpixel display element that can emit light of a third wavelength,
   said third wavelength being shorter than the second wavelength and said second wavelength being shorter than the first wavelength;
   wherein said first, second and third subpixel display elements are spatially distributed within their respective display pixel units according to a spatial distribution pattern different from an implied spatial distribution of implied first, second, and third color sensing elements that implicitly sampled an implied source image, where the implied samplings of the first, second, and third color sensing elements were implicitly used to generate said source image data,
   wherein for respective first, second, and third color sensing arrays defined by respective ones of said first, second, and third color sensing elements there are implied image source sampling areas,
   wherein for respective first, second, and third color display arrays defined by respective ones of said first, second, and third subpixel display elements there are implied image output resampling areas; and where said display further comprises:
   a respective sample-areas to resample-areas contributions mapper provided for each of the first, second, and third color display arrays, where the respective mapper of each respective one of said color display arrays maps luminance contributions from hypothetically overlying ones of the implied image source sampling areas to hypothetically underlying ones of the implied image output resampling areas for the respective one color display array and thereby defines luminance signals that are generated and used to drive the independently drivable first, second, and third subpixel display elements of the display.

2. A color display for receiving source image data representing color images and for displaying to an average human observer color images corresponding to the source image data, the display comprising:
   a plurality of substantially identical pixel units tiled across a face of the display
   where each pixel unit includes a first plurality of independently drivable first subpixel display elements that can emit light of a first wavelength,
   where each pixel unit includes a second plurality of independently drivable second subpixel display elements that can emit light of a second wavelength,
   where each pixel unit includes an independently drivable third subpixel display element that can emit light of a third wavelength,
   said third wavelength being shorter than the second wavelength and said second wavelength being shorter than the first wavelength;
   wherein said first and second wavelengths contribute significantly to perception of luminance by the average human observer while the third wavelength does not contribute significantly to perception of luminance by the average human observer;
   wherein said first, second and third subpixel display elements are spatially distributed within their respective display pixel units according to a spatial distribution pattern different from an implied spatial distribution of implied first, second, and third color sensing elements that implicitly sampled an implied source image, where the implied samplings of the first, second, and third color sensing elements were implicitly used to generate said source image data,
   wherein for respective first, second, and third color sensing arrays defined by respective ones of said first, second, and third color sensing elements there are implied image source sampling areas,
   wherein for respective first, second, and third color display arrays defined by respective ones of said first, second, and third subpixel display elements there are implied image output resampling areas; and where said display further comprises:

a respective sample-areas to resample-areas luminance contributions mapper provided for each of the first and second color display arrays that maps luminance contributions from hypothetically overlying ones of the implied image source sampling areas of the first and second wavelengths to hypothetically underlying ones of the implied image output resampling areas and thereby determines generated luminance signals that are used to drive the independently drivable first and second subpixel display elements of the display.

3. A color display adapted to receive source image data representing color images and to display color images corresponding to the source image data, the display comprising:

a plurality of substantially identical pixel units tiled across a face of the display where each pixel unit includes a first plurality of independently drivable first subpixel display elements that can emit light primarily of a first wavelength, where each pixel unit includes a second plurality of independently drivable second subpixel display elements that can emit light primarily of a second wavelength, where each pixel unit includes an independently drivable third subpixel display element that can emit light primarily of a third wavelength, where said third wavelength is shorter than the second wavelength and said second wavelength is shorter than the first wavelength;

wherein said first, second and third subpixel display elements are spatially distributed within their respective display pixel units according to a spatial distribution pattern different from an implied spatial distribution of implied first, second, and third color sensing elements that implicitly sampled an implied source image, where the implied samplings of the first, second, and third color sensing elements were implicitly used to generate said source image data, wherein for respective first, second, and third color sensing arrays defined by respective ones of said first, second, and third color sensing elements there are implied image source sampling areas, wherein for respective first, second, and third color display arrays defined by respective ones of said first, second, and third subpixel display elements there are implied image output resampling areas; and the display further comprises a respective sample-areas to resample-areas contributions mapper provided at least for each of the first and second color sensing arrays respectively, where each respective mapper maps luminance contributions from hypothetically overlying ones of the implied image source sampling areas of the respective color sensing array to hypothetically overlaid ones of the implied image output resampling areas of the respective subpixel display elements and thereby determines generated luminance signals that are used to respectively drive the independently drivable first and second subpixel display elements of the display.

4. The color display of claim 3 wherein said first wavelength is perceived as a red color, said second wavelength is perceived as a green color, and said third wavelength is perceived as a blue color.

5. The color display of claim 3 wherein the display further comprises:

a respective sample-areas to resample-areas contributions mapper provided for the third color sensing array, where said respective mapper for the third color sensing array maps luminance contributions from hypothetically overlying ones of the implied image source sampling areas of the respective third color sensing array to hypothetically overlaid ones of the implied image output resampling areas of the respective third subpixel display elements and thereby determines generated luminance signals that are used to respectively drive the independently drivable third subpixel display elements of the display.

6. The color display of claim 5 wherein said first wavelength is perceived as a red color, said second wavelength is perceived as a green color, and said third wavelength is perceived as a blue color.

7. A color display configured to receive source image data representing color images and to displaying to an average human observer color images corresponding to the source image data, the display comprising:

a plurality of substantially identical pixel units tiled across a face of the display where each pixel unit includes a first plurality of independently drivable first subpixel display elements that can emit light primarily of a first wavelength, where each pixel unit includes a second plurality of independently drivable second subpixel display elements that can emit light primarily of a second wavelength, where each pixel unit includes an independently drivable third subpixel display element that can emit light primarily of a third wavelength, where said third wavelength is shorter than the second wavelength and said second wavelength is shorter than the first wavelength;

wherein said first and second wavelengths contribute significantly to perception of luminance by the average human observer while the third wavelength does not contribute significantly to perception of luminance by the average human observer;

wherein said first, second and third subpixel display elements are spatially distributed within their respective display pixel units according to a spatial distribution pattern different from an implied spatial distribution of implied first, second, and third color sensing elements that implicitly sampled an implied source image, where the implied samplings of the first, second, and third color sensing elements were implicitly used to generate said source image data, wherein for respective first, second, and third color sensing arrays defined by respective ones of said first, second, and third color sensing elements there are implied image source sampling areas, wherein for respective first, second, and third color display arrays defined by respective ones of said first, second, and third subpixel display elements there are implied image output resampling areas; and a respective sample-areas to resample-areas contributions mapper provided for each of the first, second and third color sensing arrays respectively, where each respective mapper maps luminance contributions from hypothetically overlying ones of the implied image source sampling areas of the respective color sensing array to hypothetically overlaid ones of the implied image output resampling areas of the respective subpixel display elements and thereby determines generated luminance signals that are used to respectively drive the independently drivable first, second and third subpixel display elements of the display.

8. The color display of claim 7 wherein said first wavelength is perceived as a red color, said second wavelength is perceived as a green color, and said third wavelength is perceived as a blue color.

9. A color display configured to receive source image data representing color images and to displaying to an average human observer color images corresponding to the source image data, the display comprising:
- a plurality of substantially identical pixel units tiled across a face of the display
- where each pixel unit includes a first plurality of independently drivable first subpixel display elements that can emit light primarily of a first wavelength,
- where each pixel unit includes a second plurality of independently drivable second subpixel display elements that can emit light primarily of a second wavelength,
- where each pixel unit includes an independently drivable third subpixel display element that can emit light primarily of a third wavelength,
- where said third wavelength is shorter than the second wavelength and said second wavelength is shorter than the first wavelength;
- wherein said first and second wavelengths contribute significantly to high resolution perception of imagery by the average human observer while the third wavelength does not contribute as significantly to perception of high resolution perception of imagery by the average human observer;
- wherein said first, second and third subpixel display elements are spatially distributed within their respective display pixel units such that along a hypothetical line drawn through the first subpixel display elements of neighboring display pixel units and also through the third subpixel display elements of the same neighboring display pixel units, the third subpixel display elements repeat less often spatially relative to the spatial frequency of the first subpixel display elements.

10. The color display of claim 9 and further wherein:
said first, second and third subpixel display elements are spatially distributed within their respective display pixel units such that along a hypothetical line drawn through the second subpixel display elements of neighboring display pixel units and also through the third subpixel display elements of the same neighboring display pixel units, the third subpixel display elements repeat less often spatially relative to the spatial frequency of the second subpixel display elements.

11. The color display of claim 10 wherein said first wavelength is perceived as a red color, said second wavelength is perceived as a green color, and said third wavelength is perceived as a blue color.

* * * * *